(12) United States Patent
Ambrecht et al.

(10) Patent No.: US 10,997,816 B2
(45) Date of Patent: May 4, 2021

(54) GAMING MACHINE DESIGN FOR FACILITATING SERVICEABILITY OF ATTENDANT LIGHT ASSEMBLY

(71) Applicant: AGS LLC, Las Vegas, NV (US)

(72) Inventors: Adam Daniel Ambrecht, Kennesaw, GA (US); Mark Sameh Farid, Atlanta, GA (US)

(73) Assignee: AGS LLC, Las Vegas, NV (US)

( * ) Notice: Subject to any disclaimer, the term of this patent is extended or adjusted under 35 U.S.C. 154(b) by 0 days.

(21) Appl. No.: 16/566,990

(22) Filed: Sep. 11, 2019

(65) Prior Publication Data

US 2020/0090455 A1 Mar. 19, 2020

Related U.S. Application Data

(60) Provisional application No. 62/733,187, filed on Sep. 19, 2018.

(51) Int. Cl.
*A63F 9/24* (2006.01)
*G07F 17/32* (2006.01)
*A63F 13/90* (2014.01)

(52) U.S. Cl.
CPC .......... *G07F 17/3211* (2013.01); *A63F 13/90* (2014.09); *G07F 17/3216* (2013.01)

(58) Field of Classification Search
CPC .. G07F 17/3216; G07F 17/32; G07F 17/3213; G07F 17/3211; A63F 13/08; A63F 13/90; E05B 65/00
See application file for complete search history.

(56) References Cited

U.S. PATENT DOCUMENTS

| | | | | |
|---|---|---|---|---|
| 6,678,919 B1* | 1/2004 | Sokolov | ................ | E05D 7/1066 16/266 |
| 2004/0061284 A1* | 4/2004 | Satoh | .................. | G07F 17/3216 273/138.1 |
| 2004/0192433 A1* | 9/2004 | Johnson | ................... | G07F 17/32 463/20 |
| 2005/0107167 A1* | 5/2005 | Sasaki | ..................... | A63F 13/08 463/46 |
| 2005/0113174 A1* | 5/2005 | Izawa | ................. | G07F 17/3216 463/46 |
| 2006/0287112 A1* | 12/2006 | Mallory | .............. | G07F 17/3216 463/46 |
| 2008/0113708 A1* | 5/2008 | Beadell | ................... | A63F 13/08 463/16 |
| 2013/0143647 A1* | 6/2013 | Fujisawa | ............... | G07F 17/323 463/25 |

* cited by examiner

*Primary Examiner* — Justin L Myhr
(74) *Attorney, Agent, or Firm* — Wolf IP Law PLLC; Dean E. Wolf, Esq.

(57) ABSTRACT

Various aspects described or referenced herein are directed to improved electronic gaming device ("EGD") designs for facilitating access and serviceability of the EGD's service light assembly. In at least some embodiments, the improved EGD design features allow for the EGD's service light assembly to be fully assembled, disassembled and/or serviced from the front of the EGD by accessing the interior of the EGD cabinet from a hinged main door assembly which configured to open upwards.

10 Claims, 15 Drawing Sheets

FIG. 13  ⬉ —1300

GAMING MACHINE DESIGN FOR FACILITATING SERVICEABILITY OF ATTENDANT LIGHT ASSEMBLY

RELATED APPLICATION DATA

The present application claims benefit, pursuant to the provisions of 35 U.S.C. § 119, of U.S. Provisional Application Ser. No. 62/733,187, titled "IMPROVED GAMING MACHINE DESIGN FOR FACILITATING SERVICEABILITY OF ATTENDANT LIGHT ASSEMBLY", naming Ambrecht et al. as inventors, and filed 19 Sep. 2018, the entirety of which is incorporated herein by reference for all purposes.

TECHNICAL FIELD

The present disclosure relates generally to gaming devices, such as electronic wager-based gaming devices. More particularly, the present disclosure relates to apparatus and methods for facilitating secure access to, and servicing of, electronic gaming devices.

BACKGROUND

Gaming in the United States is divided into Class I, Class II and Class III games. Class I gaming includes social games played for minimal prizes, or traditional ceremonial games. Class II gaming includes bingo games, pull tab games, lotto, keno, and other similar games. Class III gaming includes any game that is not a Class I or Class II game, such as a game of chance typically offered in non-Indian, state-regulated casinos. Many games of chance that are played on wager-based gaming devices fall into the Class II and Class III categories of games.

Electronic gaming devices such as video slot machines and video poker machines are becoming increasingly popular. Part of the reason for their increased popularity is the nearly endless variety of games that can be made available for play on a single gaming device. Advancements in video and electronic gaming enable the operation of more complex games that would not otherwise be possible on mechanical-driven gaming devices or personal computers. For reference purposes, electronic wager-based gaming devices may be referred to as "EGDs" ("EGD" in singular form) or electronic gaming machines (EGMs).

Various games, particularly the Class II and Class III categories of games, can be implemented as server-based games in a server-client system. In a server-based gaming arrangement, a gaming server serves multiple gaming devices as clients. For example, a casino can include a plurality of EGDs located on the game floor, and a connected gaming server located in a back room of the casino. Generally, the games and capabilities of and EGD depend on the central server. Games can be downloaded from the central server to the EGDs for execution, for instance, when initiated by casino operations management. Alternatively, the central server can execute the games and output game data to the EGDs.

To enhance the gaming experience, there are a number of peripheral components/devices that can be connected to EGDs. Examples of these devices include player tracking units, lights, ticket printers, card readers, speakers, bill acceptors/validators, ticket readers, coin acceptors, display panels, key pads, coin hoppers, button pads, service lights, and the like. These peripheral devices are built into the EGD or otherwise attached to the EGD.

In the heavily regulated field of wager-based gaming, EGDs and their associated peripheral devices are required to be compliant with current wager-based gaming regulatory standards such as, for example, the well-known GLI standards, which have already been approved in various gaming jurisdictions. One example of a GLI standard is the GLI-11 standard version 3.0, Published Sep. 21, 2016 by Gaming Laboratories International, LLC, the entirety of which is herein incorporated by reference for all purposes.

One important consideration for casino operators relates to the ability of EGD service technicians to quickly access and service EGDs deployed in "the field" (e.g., EGDs deployed on a casino floor) while also maintaining proper levels of security. For example, if a component of an EGD needs to be inspected, serviced, and/or tested, a service technician may be dispatched to the EGD's location in order to perform the desired service/testing/inspection in the field.

Traditionally, many gaming machine manufactures design their EGD cabinets to conform with established industry standards, such as, for example, not exceeding a total width of 28 inches. EGDs which are configured or designed to confirm with industry standards allow for casino establishments to more efficiently utilize and maximize available floorspace, for example, by deploying banks of adjacent EGDs as illustrated, for example, in FIG. 13. However, EGDs which are deployed in banked configurations offer little, if any, serviceability from the sides.

In many situations, the servicing, changing the color of the service light assembly, and/or inspection of an EGD service light assembly (and/or its components) requires access to the service light assembly, and may require removal or detachment of the service light assembly from the gaming machine cabinet. In many EGD designs such as, for example, the Orion Slant EGD (sold by AGS LLC of Las Vegas, Nev.), the service light assembly is accessible via opening of the main door of the EGD, which provides access to the EGD components located at the interior of the EGD cabinet.

However, in at least some EGD designs, the main door may be hinged to the cabinet at the top and may be configured or designed to open upwards. When the main door is opened upwards, it may block access to the attendant light from the front. In such situations, the only accessible area to service and mount/dismount the service light assembly is from inside the cabinet. Security must be maintained and therefore exposed fasteners (e.g., at the exterior of the gaming cabinet) cannot exist. Additionally, industrial design ("ID") considerations also need to be maintained from the outside in the closed position, including, for example, maintaining a combination of low-profile, sleek design, and no exposed fasteners.

Accordingly, one object of the present disclosure is to provide an improved EGD design for facilitating access and serviceability of the EGD's service light assembly, particularly with respect to EGDs which include a main door that opens upward. A further object is to provide an improved EGD design which allows for the service light assembly to be modified, configured, assembled, disassembled and/or serviced from the interior of the EGD cabinet with the main door open and without requiring access to the sides, back or top of the cabinet.

BRIEF DESCRIPTION OF THE DRAWINGS

The included drawings are for illustrative purposes and serve only to provide examples of possible structures and arrangements for the disclosed inventive apparatuses, systems and methods for EGDs having improved accommodations for limited mobility players. These drawings in no way limit any changes in form and detail that may be made to the disclosure by one skilled in the art without departing from the spirit and scope of the disclosure.

DETAILED DESCRIPTION OF EXAMPLE EMBODIMENTS

Overview

Figure 1:
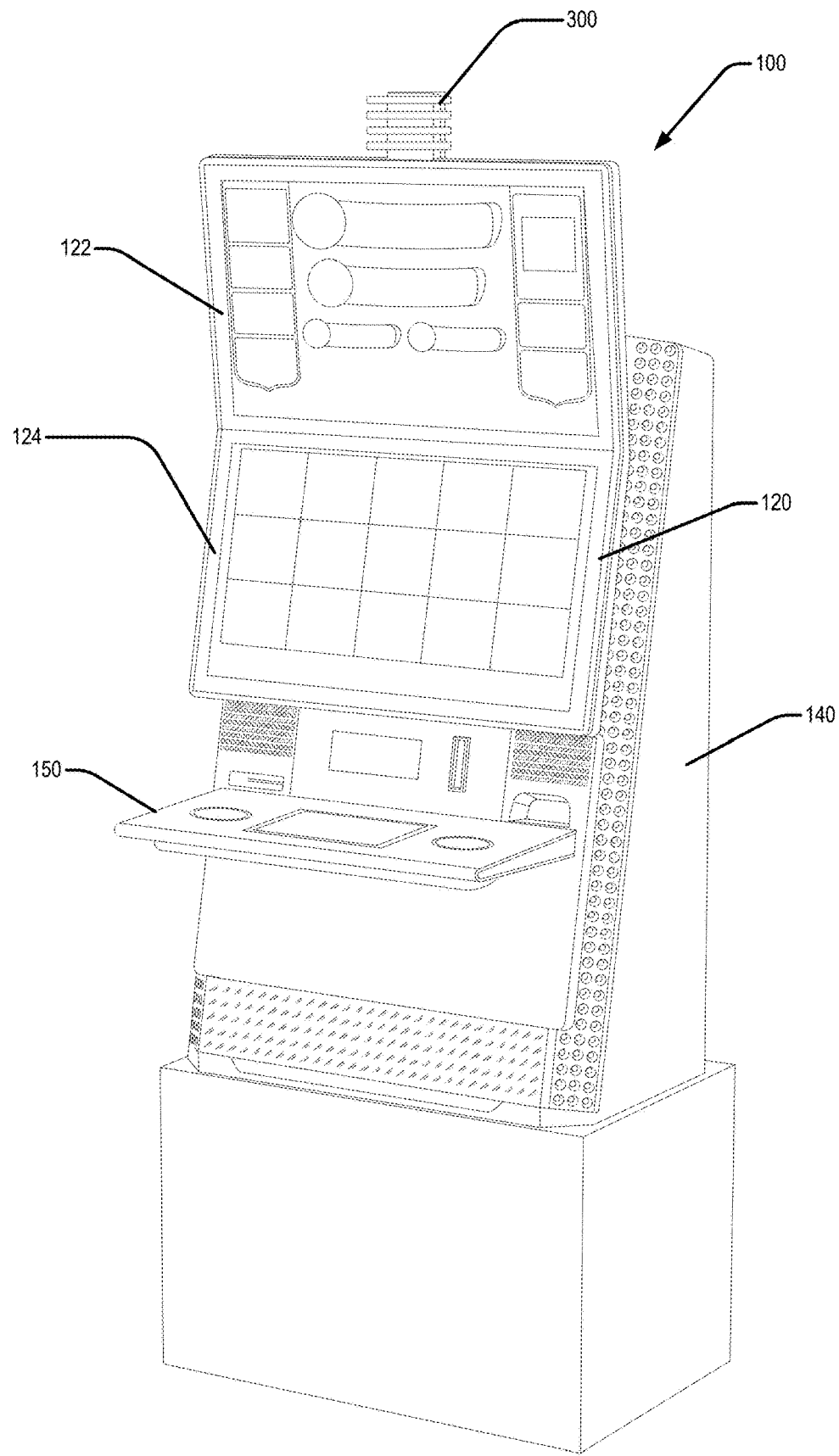
FIG. 1 illustrates a front perspective view of an example embodiment of an electronic gaming device ("EGD") 100 having its main access door (e.g., 120) configured in a closed position.

Various aspects described or referenced herein are directed to different methods and systems for facilitating secure access to various components of electronic wager-based gaming devices such as video slot machines, video poker machines, and other types of wager-based gaming machines.

More specifically, various aspects described herein are directed to improved electronic gaming device ("EGD") designs for facilitating access and serviceability of the EGD's service light assembly (also referred to as an "attendant light" or "attendant light assembly"). In at least some embodiments, the improved EGD design features allow for the EGD's service light assembly to be modified, configured, assembled, disassembled and/or serviced from the front of the EGD by accessing the interior of the EGD cabinet from a hinged main door assembly which configured to open upwards.

One aspect of the present disclosure is directed to an improved EGD design for facilitating access and serviceability of the EGD's service light assembly, particularly with respect to EGDs which include a main door that opens upward. An additional aspect is to provide an improved EGD design which allows for the service light assembly to be assembled, disassembled, modified, configured, and/or serviced from the interior of the EGD cabinet with the main door open and without requiring access to the sides, back or top of the cabinet.

In at least one embodiment, the EGD design improvements disclosed herein may be incorporated into an EGD which includes a hinged main door assembly that opens upwards. The EGD design improvements provide the ability for the service light assembly to be modified, configured, assembled, disassembled, removed, installed and/or serviced via the interior of the EGD cabinet with the main door open and without requiring access to the sides, back or top of the cabinet. Additionally, the improved design features of the EGD, provide the ability for the service light assembly to be fully serviced from the interior of the EGD cabinet via the main door assembly.

Various system(s) and/or method(s) are described herein which relate to at least one gaming machine embodiment comprising: a cabinet including an entry that provides access to an interior of the cabinet, the cabinet further including external side portions, an external back portion, and an external top portion; a hinged main door assembly pivotably attached to the cabinet, the main door assembly being movable to a closed position which prevents access to the interior of the cabinet, the main door assembly being further movable to an open position which allows access to the interior of the cabinet; a first hinge connecting the main door assembly to the cabinet in a manner which enables the main door assembly to open upwards; a service light assembly having a candle assembly portion disposed at an exterior portion of the cabinet, the service light assembly being removably attachable to the main door assembly via a first set of fasteners; the cabinet including a first opening deployed at a rear portion of the cabinet, the first opening having a size and shape which enables the candle assembly portion to pass there through; a first plate removably attachable to the cabinet by a second set of fasteners, the first plate being attachable to the cabinet in a manner which covers or plugs the first opening; and wherein an entirety of the service light assembly is accessible and serviceable from the interior of the cabinet while the main door assembly is configured in the open position.

Other system(s) and/or method(s) are described herein which relate to at least one gaming machine embodiment comprising: a cabinet including an entry that provides access to an interior of the cabinet, the cabinet further including external side portions, an external back portion, and an external top portion; main door assembly means pivotably attached to the cabinet, the main door assembly means being movable to a closed position which prevents access to the interior of the cabinet, the main door assembly means being further movable to an open position which allows access to the interior of the cabinet; first hinge connecting the main door assembly means to the cabinet in a manner which enables the main door assembly means to open upwards; service light assembly means having a candle assembly means portion disposed at an exterior portion of the cabinet, the service light assembly means being removably attachable to the main door assembly means via a first set of fasteners; the cabinet including a first opening deployed at a rear portion of the cabinet, the first opening having a size and shape which enables the candle assembly means portion to pass therethrough; a first plate removably attachable to the cabinet by a second set of fasteners, the first plate being attachable to the cabinet in a manner which covers or plugs the first opening; and wherein an entirety of the service light assembly means is accessible and serviceable from the interior of the cabinet while the main door assembly means is in the open position.

In some embodiments, an entirety of the service light assembly is accessible and serviceable from a front of the cabinet via the main door assembly and without requiring access to the external side portions, external back portion, and/or external top portion of the cabinet. In some embodiments, an entirety of the service light assembly is accessible and serviceable from a front of the cabinet via the main door assembly and without requiring access to the external side portions, external back portion, and/or external top portion of the cabinet. In some embodiments, the service light assembly is removably attachable to the cabinet via a front of the cabinet while the main door assembly is configured in the open position and without requiring access to the external side portions, external back portion, and/or external top portion of the cabinet. In some embodiments, the service light assembly comprises a DIP switch which is accessible without removal of any fasteners.

Additional objects, features and advantages of the various aspects described or referenced herein will become apparent from the following descriptions of its example embodiments, which descriptions should be taken in conjunction with the accompanying drawings.

Specific Example Embodiments

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way. Devices that are in communication with each other need not be in continuous communication with each other, unless expressly specified otherwise. In addition, devices that are in communication with each other may communicate directly or indirectly through one or more intermediaries. A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (e.g., whether or not they cooperate) may be used in place of a single device/article. Similarly, where more than one device or article is described (e.g., whether or not they cooperate), it will be readily apparent that a single device/article may be used in place of the more than one device or article. The functionality and/or the features of a device may be alternatively embodied by one or more other devices that are not explicitly described as having such functionality/features. Thus, other embodiments of one or more of the invention(s) need not include the device itself. Techniques and mechanisms described or reference herein will sometimes be described in singular form for clarity. However, it should be noted that particular embodiments include multiple iterations of a technique or multiple instantiations of a mechanism unless noted otherwise.

Although these embodiments are described in sufficient detail to enable one skilled in the art to practice the disclosure, it is understood that these examples are not limiting, such that other embodiments may be used, and changes may be made without departing from the spirit and scope of the disclosure.

Turning first to FIG. 1, an EGD 100 according to one embodiment of the present disclosure is illustrated in front perspective view. In various embodiments, methods of game play and presentation can be implemented via an EGD or device 100. Such an EGD 100 may have various configurations, and again may facilitate the play of wager-based games or other games that are not wager-based. The EGD 100 may be located at a casino or other gaming establishment. The EGD 100 may be part of a gaming system, such as a casino gaming system which links multiples of the EGDs, one or more table games, and/or other devices such as kiosks, accounting systems, progressive systems, player tracking systems, respective servers thereof, and the like.

As illustrated, EGD 100 generally comprises a physical housing or cabinet 140 for supporting and/or enclosing various components required for operation of the EGD. Housing 140 can include a main access door (e.g., 142), the door capable of being moved between an open position that allows access to the interior of the gaming cabinet, and a closed position where access to the interior is generally prevented. Configurations of the EGD 100 may vary. Although EGD 100 has an "upright" configuration as shown, alternative configurations, shapes, or dimensions can include a "slant" type, "bar-top" type, "cocktail table" type, and/or other configurations, as are well known to those of skilled in the art.

In various embodiments, EGD 100 can be configured to present one or more wager-based games upon a player making a monetary payment or wager. In this regard, EGD 100 can include means for accepting monetary value or coin in. In various embodiments, certain game outcomes may be designated as winning outcomes. Prizes or awards may be provided for winning outcomes, such as monetary payments (or representations thereof, such as prize of credits), or promotional awards. The EGD 100 can also include mean for returning unused monetary funds and/or dispensing winnings to a player, such as by way of physical coins, printed tickets, cash vouchers, electronically stored credits to player accounts, and the like. In some embodiments, the EGD 100 may include a coin acceptor and a coin tray.

In the specific example embodiment of FIG. 1, EGD 100 includes a main cabinet 140, which generally surrounds the machine interior and is viewable by users. Mounted to the cabinet is a service light assembly 300 which extends upward from the top of the cabinet.

In the specific example embodiment of FIG. 1, EGD 100 is also configured or designed to include a plurality of video displays (e.g., 122, 124) such as a high-resolution, flat-panel liquid crystal displays (LCD), which, for example, may be configured or designed to display game play content and/or information relating to various aspects of wager-based game play and/or other content. According to different embodiments, the width of one or more the EGD monitors may range, for example, from 17 inches to 27 inches.

It is noted that in banked EGD configurations (e.g., such as those illustrated in FIGS. 11, 12, 13), increases in monitor sizes of EGDs, as well as the overall width of the cabinets, may significantly reduce or eliminate any possibility of serviceability from the sides.

In the specific example embodiment of FIG. 1, EGD 100 includes a main door assembly 120 which, when opened, provides access to the interior of the EGD cabinet, as well as access to EGD components disposed therein. In the specific example embodiment of FIG. 1, the main door assembly 120 is hinged to the cabinet at the top (e.g., as more clearly illustrated at 122, FIG. 5), and is configured or designed to open upwards, as illustrated for example, in FIG. 2.

In at least some embodiments, the EGD 100 may also include a player tracking module. In one embodiment, the player tracking module may include a key pad for entering player tracking information, a display for displaying player tracking information, and a card reader or RFID reader for entering a magnetic striped card or RFID card containing player tracking information. In at least some embodiments, EGM 100 also includes a bill validator and ticket printer, which are both securely disposed within the interior of EGM cabinet.

In at least some embodiments, the EGM may include one or more interfaces configured or designed to provide player tracking services and other game services to a player playing a game on the EGD 100. For example, in one embodiment, one or more EGM interfaces may be configured or designed to facilitate, enable, initiate, and/or perform one or more of the following: 1) input player tracking identification information, 2) view account information and perform account transactions for accounts such as player tracking accounts and bank accounts, 3) receive operating instructions, 4) redeem prizes or comps including using player tracking points to redeem the prize or comp, 5) make entertainment service reservations, 6) transfer credits to cashless instruments and other player accounts, 7) participate in casino promotions, 8) select entertainment choices for output via video and audio output mechanisms, 9) play games and bonus games, 10) request gaming services such as drink orders, 11) communicate with other players or casino service personnel and 12) register a player for a loyalty program such as a player tracking program. In addition, in at least some embodiments, one or more EGM interfaces may be used by casino service personnel to: a) access diagnostic menus, b) display player tracking unit status information and EGD status information, c) access EGD metering information and d) display player status information.

Many different types of games, including mechanical slot games, video slot games, video poker, video blackjack, video pachinko and lottery, may be provided on EGD 100. The EGD 100 is operable to provide play of many different instances of games of chance. The instances may be differentiated according to themes, sounds, graphics, type of game (e.g., slot game vs. card game), denomination, number of paylines, maximum jackpot, progressive or non-progressive, bonus games, etc. The EGD 100 may be operable to allow a player to select a game of chance to play from a plurality of instances available on the EGD. For example, the EGD may provide a menu with a list of the instances of games that are available for play on the EGD and a player may be able to select from the list a first instance of a game of chance that they wish to play.

The various instances of games available for play on the EGD 100 may be stored as game software on a mass storage device in the EGD or may be generated on a remote EGD but then displayed on the EGD. The EGD 100 may execute game software, such as but not limited to video streaming software that allows the game to be displayed on the EGD. When an instance is stored on the EGD 100, it may be loaded from the mass storage device into a RAM for execution. In some cases, after a selection of an instance, the game software that allows the selected instance to be generated may be downloaded from a remote EGD, such as another EGD.

Understand that EGD 100 is but one example from a wide range of EGDs on which the present invention may be implemented. Also, a game may be generated on a host computer and may be displayed on a remote terminal or a remote EGD. The remote EGD may be connected to the host computer via a network of some type such as a local area network, a wide area network, an intranet or the Internet, by a wired or wireless connection. The remote EGD may be a portable EGD such as but not limited to a cell phone, a personal digital assistant, and a wireless game player. Images rendered from 3-D gaming environments may be displayed on portable EGDs that are used to play a game of chance. Further, an EGD or server may include gaming logic for commanding a remote EGD to render an image from a virtual camera in a 3-D gaming environment stored on the remote EGD and to display the rendered image on a display located on the remote EGD. Thus, those skilled in the relevant art will understand that the present invention, as described below, can be deployed on most any EGD now available or hereafter developed.

Some EGDs are implemented with special features and/or additional circuitry that differentiates them from general-purpose computers (e.g., desktop personal computers and laptops). EGDs are highly regulated to ensure fairness and, in many cases, EGDs are operable to dispense monetary awards of multiple millions of dollars. Therefore, to satisfy security and regulatory requirements in a gaming environment, hardware and software architectures may be implemented in EGDs that differ significantly from those of general-purpose computers. A description of EGDs relative to general-purpose computing machines and some examples of the additional (or different) components and features found in EGDs are described below.

At first glance, one might think that adapting PC technologies to the gaming industry would be a simple proposition because both PCs and EGDs employ microprocessors that control a variety of devices. However, because of such reasons as 1) the regulatory requirements that are placed upon EGDs, 2) the harsh environment in which EGDs operate, 3) security requirements, and 4) fault tolerance requirements, adapting PC technologies to an EGD can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in an EGD because in an EGD these faults can lead to a direct loss of funds from the EGD, such as stolen cash or loss of revenue when the EGD is not operating properly.

For the purposes of illustration, a few differences between PC systems and gaming systems will be described. A first difference between EGDs and common PC based computers systems is that EGDs are designed to be state-based systems. In a state-based system, the system stores and maintains its current state in a non-volatile memory, such that, in the event of a power failure or other malfunction the EGD will return to its current state when the power is restored. For instance, if a player was shown an award for a game of chance and, before the award could be provided to the player the power failed, the EGD, upon the restoration of power, would return to the state where the award is indicated. This requirement affects the software and hardware design on an EGD. As anyone who has used a PC knows, PCs are not state machines and a majority of data is usually lost when such a malfunction occurs.

A second important difference between EGDs and common PC based computer systems relates to security features. For example, in the heavily regulated field of wager-based gaming, EGDs and their associated peripheral devices are required to be compliant with rigorous wager-based gaming regulatory standards. Such gaming regulatory standards often include detailed provisions specifying security standards which must be satisfied and/or maintained with respect to the EGD and its components, particularly those components located at the interior of the EGD, such as, for example, processors, memory, ticket dispensers, bill validators, and the like. In order for gaming manufacturers to comply with such security standards, it is important that their EGD design(s) provide adequate security mechanisms to monitor and control authorized access to the EGD's components, particularly the components located at the interior of the EGD. Additionally, it is important that their EGD design(s) provide adequate security mechanisms to detect and prevent unauthorized access to (and prevent tampering with) the EGD's components, particularly the components located at the interior of the EGD.

Another important difference between EGDs and common PC based computer systems is that for regulation purposes, the software on the EGD used to generate the game of chance and operate the EGD has been designed to be static and monolithic to prevent cheating by the operator of the EGD. For instance, one solution that has been employed in the gaming industry to prevent cheating and satisfy regulatory requirements has been to manufacture an EGD that can use a proprietary processor miming instructions to generate the game of chance from an EPROM or other form of nonvolatile memory. The coding instructions on the EPROM are static (non-changeable) and must be approved by a gaming regulator in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burned, approved by the gaming jurisdiction and installed on the EGD in the presence of a gaming regulator. Regardless of whether the EPROM solution is used, to gain approval in most gaming jurisdictions, an EGD must demonstrate sufficient safeguards that prevent an operator or player of an EGD from manipulating hardware and software in a manner that gives them an unfair and in some cases an illegal advantage. The EGD should have a means to determine if the code it will execute is valid. If the code is not valid, the EGD must have a means to prevent the code from being executed. The code validation requirements in the gaming industry affect both hardware and software designs on EGDs.

A third important difference between EGDs and common PC based computer systems is that the number and kinds of peripheral devices used on an EGD are not as great as on PC based computer systems. Traditionally, in the gaming industry, EGDs have been relatively simple in the sense that the number of peripheral devices and the number of functions of the EGD have been limited. Further, in operation, the functionality of EGDs were relatively constant once the EGD was deployed, i.e., new peripherals devices and new gaming software were infrequently added to the EGD. This differs from a PC where users will buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on an EGD, EGDs still have unique device requirements that differ from a PC, such as device security requirements not usually addressed by PCs. For instance, monetary devices, such as coin dispensers, bill validators, ticket printers and computing devices that are used to govern the input and output of cash to an EGD have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in EGDs that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory. Additionally, at least some EGM embodiments may be configured or designed to include unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

In at least some embodiments, the serial interfaces may be used to transmit information using communication protocols that are unique to the gaming industry. For example, SAS is a communication protocol used to transmit information, such as metering information, from an EGD to a remote device. Often SAS is used in conjunction with a player tracking system.

In at least some embodiments, the EGM may be treated as peripheral devices to a casino communication controller and connected in a shared daisy chain fashion to a single serial interface. The peripheral devices may preferably be assigned device addresses. In some embodiments, the serial controller circuitry may be configured or designed to implement a method to generate or detect unique device addresses. General-purpose computer serial ports are not able to do this.

The EGM may also include switch based security monitoring circuits and other security monitoring circuits configured or designed to detect intrusion into the EGD by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the EGD can determine whether any security violations occurred while power was off, e.g., via software for reading status registers. This can trigger event log entries and further data authentication operations by the slot machine software.

Trusted memory devices are preferably included as part of the EGM hardware to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents in a separate third party verification device. Once the trusted memory device is verified as authentic, and based on the approval of the verification algorithms contained in the trusted device, the EGD is allowed to verify the authenticity of additional code and data that may be located in the gaming computer assembly, such as code and data stored on hard disk drives.

Mass storage devices used in a general purpose computer typically allow code and data to be read from and written to the mass storage device. In an EGD environment, modification of the gaming code stored on a mass storage device is strictly controlled and would only be allowed under specific maintenance type events with electronic and physical enablers required. Though this level of security could be provided by software, EGMs which include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

In at least one embodiment, at the start of the game, the player may enter playing tracking information via a player tracking interface. Further, other game preferences of the player playing the game may be read from a card inserted into a card reader. During the game, the player views game information using the video display 8. During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input buttons of the button panel assembly 150, touchscreen display(s), and/or other devices which enable players to input information into the EGD.

As noted above, one important consideration for casino operators relates to the ability of EGD service technicians to quickly access (e.g., for purpose(s) of servicing, inspecting, repairing, testing, etc.) EGDs (and associated EGD components) deployed in the field. For example, if a component of an EGD (or component thereof) needs to be inspected, modified, configured, serviced, and/or tested, a service technician may be dispatched to the EGD's location (e.g., on the casino floor) in order to perform the desired service/testing/inspection "on site" (e.g., without having to remove the EGD from the casino floor).

In many situations, the servicing or inspection of an EGD service light assembly (and/or its components) requires access to the service light assembly, and may require removal or detachment of the service light assembly from the gaming machine cabinet. In many EGD designs such as, for example, the Orion Slant EGD (sold by AGS LLC of Las Vegas, Nev.), the service light assembly is accessible via opening of the main door assembly of the EGD, which provides access to the EGD components located at the interior of the EGD cabinet.

In the specific example embodiment of FIG. 1, EGD 100 includes a main door assembly 120 which, when opened, provides access to the interior of the EGD cabinet, as well as access to EGD components disposed therein.

Figure 2:
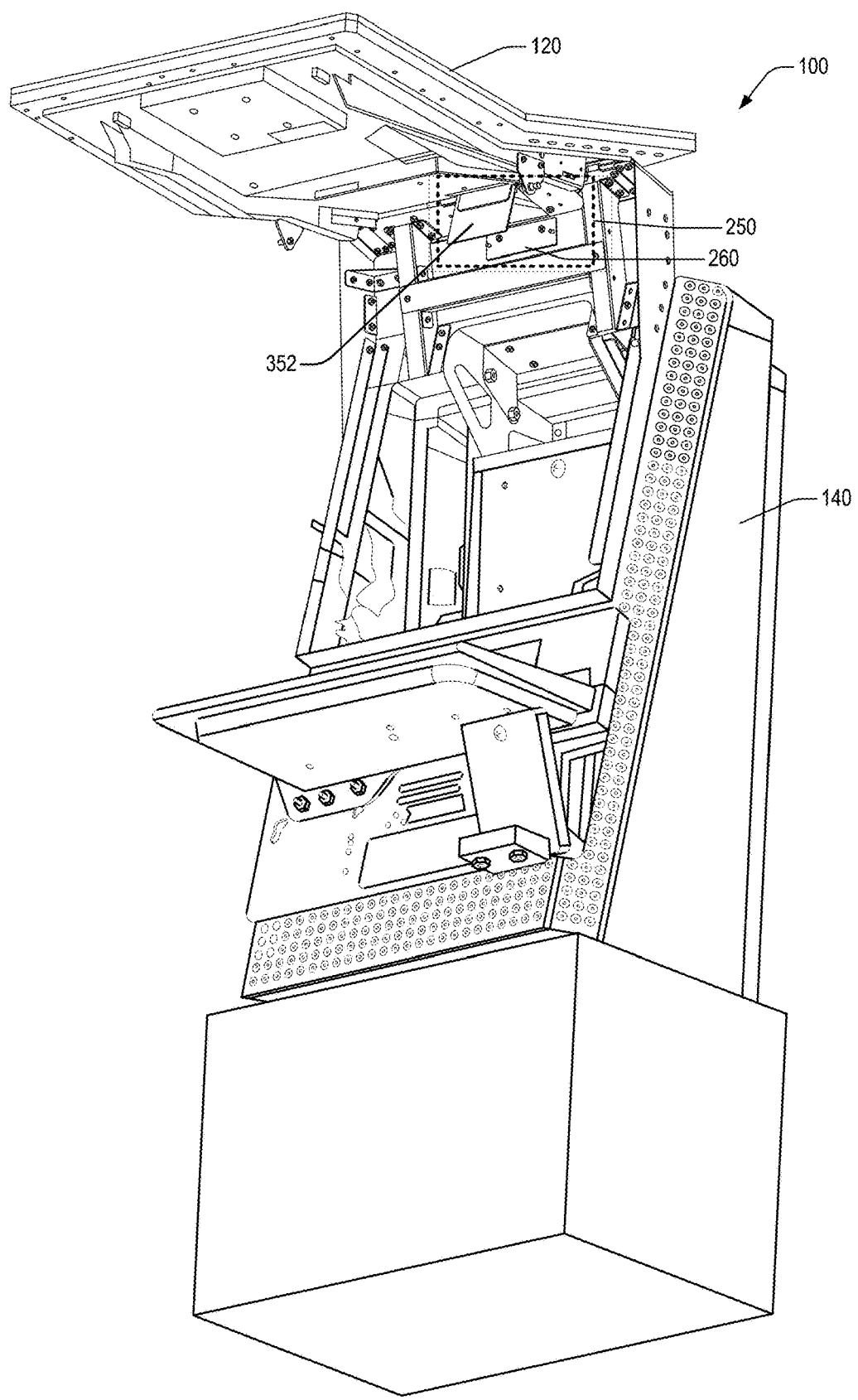
FIG. 2 illustrates a front perspective view of the EGD 100 having its main access door (e.g., 120) configured in an open position.

In the specific example embodiment of FIG. 1, the main door assembly 120 is hinged to the cabinet at the top (e.g., as more clearly illustrated at 122, FIG. 5), and is configured or designed to open upwards, as illustrated for example, in FIG. 2. In the example embodiment of FIG. 1, EGD 100 is shown having its main door assembly 120 configured in a closed position.

FIG. 2 illustrates a front perspective view of the EGD 100 having its main access door (e.g., 120) configured in an open position. As illustrated in the example embodiment of FIG. 2, when the main door assembly 120 is opened upwards, it blocks access to the attendant light assembly from the front. In such situations, the only accessible area to service and mount/dismount the service light assembly is from inside the cabinet. Additionally it is noted that, for regulatory and security compliance purposes, the exterior of the EGD is not permitted to include any exposed fasteners, meaning that it is not permissible for the service light assembly to be attached to the EGD cabinet using external or exposed fasteners. Additionally, industrial design ("ID") considerations also need to be maintained from the outside in the closed position, including, for example, maintaining a combination of low-profile, sleek design, and no exposed fasteners. Such design considerations may necessitate an improved EGD designs such as those disclosed herein.

Accordingly, one object of the present disclosure is to provide an improved EGD design for facilitating access and serviceability of the EGD's service light assembly, particularly with respect to EGDs which include a main door that opens upward. A further object is to provide an improved EGD design which allows for the service light assembly to be modified, configured, assembled, disassembled and/or serviced from the interior of the EGD cabinet with the main door open and without requiring access to the sides, back or top of the cabinet.

As illustrated in the example embodiment of FIG. 2, when the main door assembly 120 is in its open position, access is provided (e.g., from the front of the EGD) to various internal components located at the interior of the EGD cabinet, including, for example:

Components of the service light assembly including, for example:
service light security plate 352;
screws (e.g., 353, FIG. 4) which are used to secure the service light assembly to the main door assembly);
electrical connections to the service light assembly;
etc.
Back Plate 260 (and associated components thereof).
And a variety of other EGD components which may be disposed at the interior of the EGD cabinet.

Figure 3:
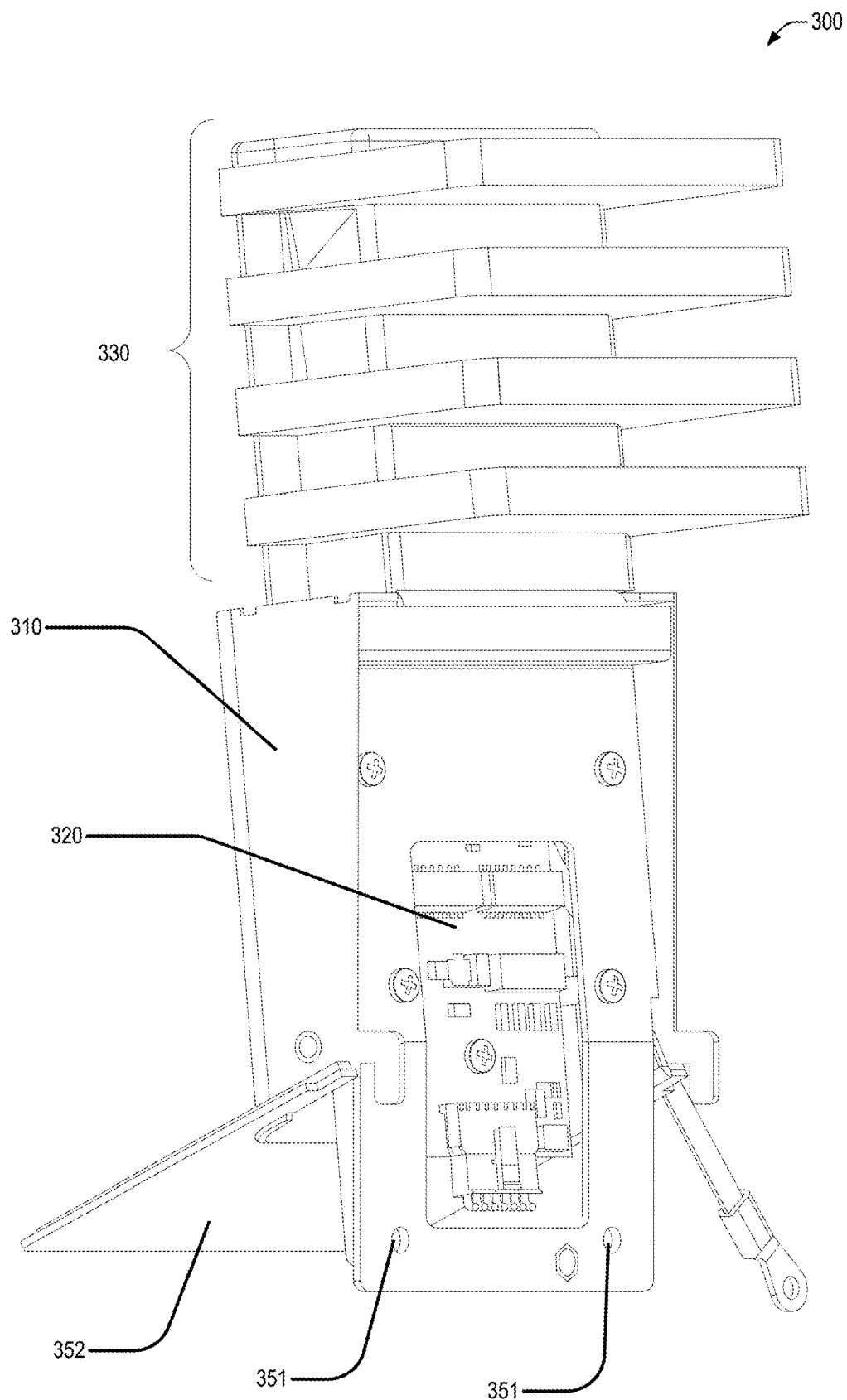
FIG. 3 shows a front perspective view of a service light assembly in accordance with a specific embodiment.

FIG. 3 shows a front perspective view of a service light assembly in accordance with a specific embodiment. As illustrated in the example embodiment of FIG. 3, service light assembly 300 includes a plurality of components including, for example:
Security plate 352.
Frame portion 310.
Candle assembly portion 330, which may include lighting components (e.g., LEDs), for enabling the candle assembly portion to display various colors.
Electrical PC board 320 which includes configurable DIP switches which are used for modifying or changing the displayed color(s) (e.g., LED colors) of candle assembly portion 330.
Screw holes 351, which, in at least one embodiment, may be used for securely attaching service light assembly 300 to the main door assembly 120.

As disclosed in greater detail herein, an improved EGD design is described which provides the ability for a service light assembly (such as, for example, 300, FIG. 3) to be modified, configured, assembled, disassembled, installed, removed and/or serviced, all from accessing the interior of the EGD cabinet from the front of the EGD via a hinged main door assembly that opens upwards, and without requiring access to the sides, back or top of the cabinet. In at least one embodiment, the modifying and/or configuring of the service light assembly may include changing the displayed color(s) of the candle assembly portion 330.

Figure 4:
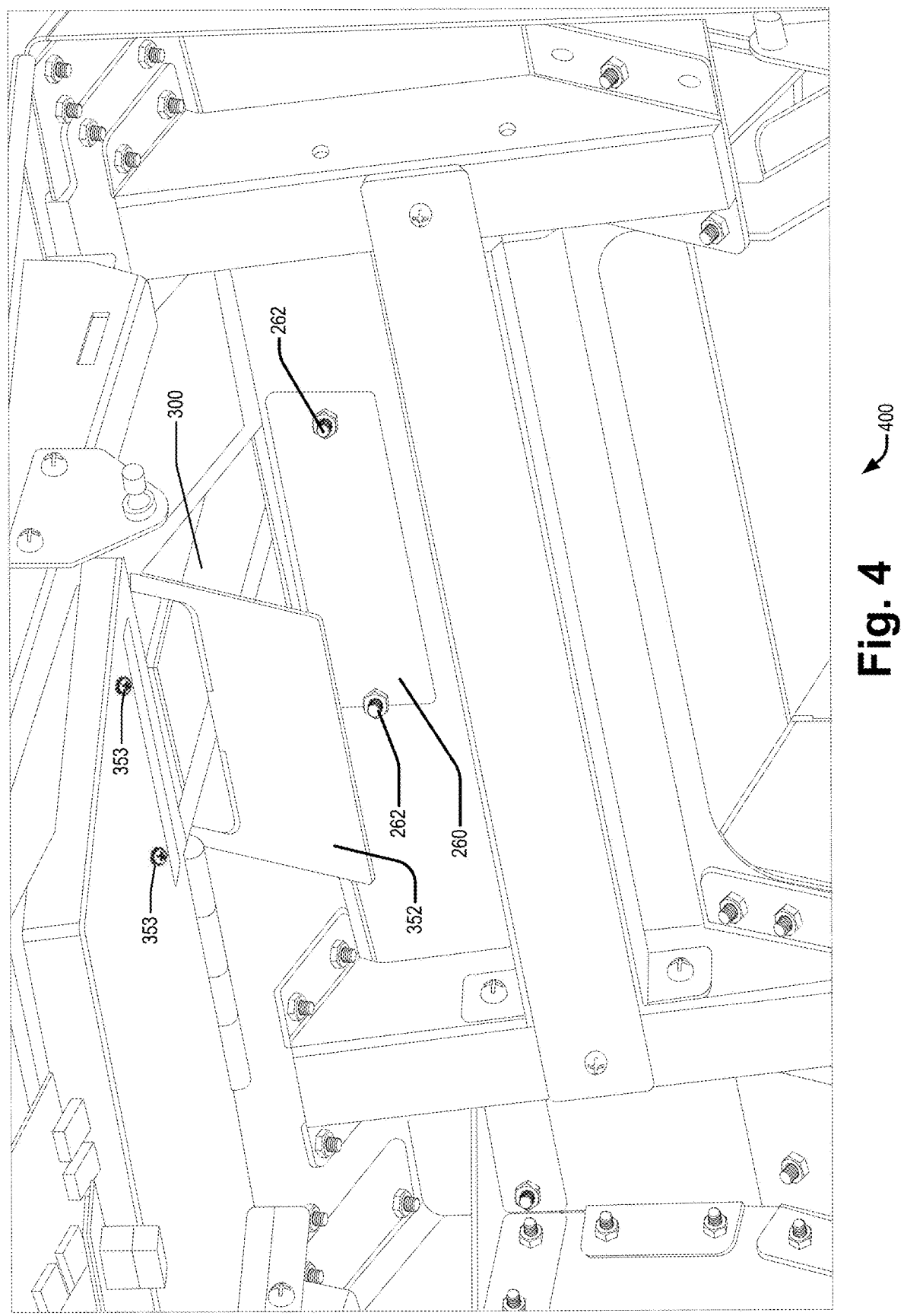
FIG. 4 shows a portion of EGD components 400 disposed at the interior of an EGD cabinet.

FIG. 4 shows a portion of EGD components 400 disposed at the interior of the EGD cabinet. As illustrated in the example embodiment of FIG. 4, the interior components of the EGD may include, for example:

Service light assembly 300 (including security plate 352).
Screws 353, which are used to attach/detach the service light assembly 300 to/from the main door assembly 120.
Back Plate 260 (and associated components thereof), which is removably attached to the gaming cabinet via fasteners 262. According to different embodiments, fasteners 262 may include one or more of the following (or combinations thereof): screws, nuts, bolts, pins, and/or other types of fasteners which may be removably attached to each other.

Additionally as shown in FIG. 4, a sequence of procedures (e.g., 1, 2, 3a, 3b) is described for removing service light assembly (e.g., 300, FIG. 3) from the interior of the EGD cabinet 100 (which includes a hinged main door assembly that opens upwards). In at least one embodiment, this sequence of procedures includes, for example:

Unlocking and opening the main door assembly to its fully open position;
Removing fasteners (e.g., nuts 262) from their screw threads to allow back plate 260 to be removed;
Removing back plate 260 to expose an opening (e.g., Back Plate Opening 801, FIG. 8);
Removing fasteners (e.g., screws 353) which attach the service light assembly 300 to the main door assembly 120;
Detaching the service light assembly 300 from electrical interface(s).
Moving the service light assembly 300 into the back plate opening 801 (e.g., as illustrated in FIG. 9); and
Removing the service light assembly 300 removable by sliding or moving the service light assembly through the Back Plate Opening 801 toward the front of cabinet.

FIGS. 5-10 show a sequence of rear perspective views of a portion of EGD 100, illustrating how the service light assembly 300 may be serviced and/or removed from the EGD by accessing the interior of the EGD from the front via the main door assembly.

Figure 5:
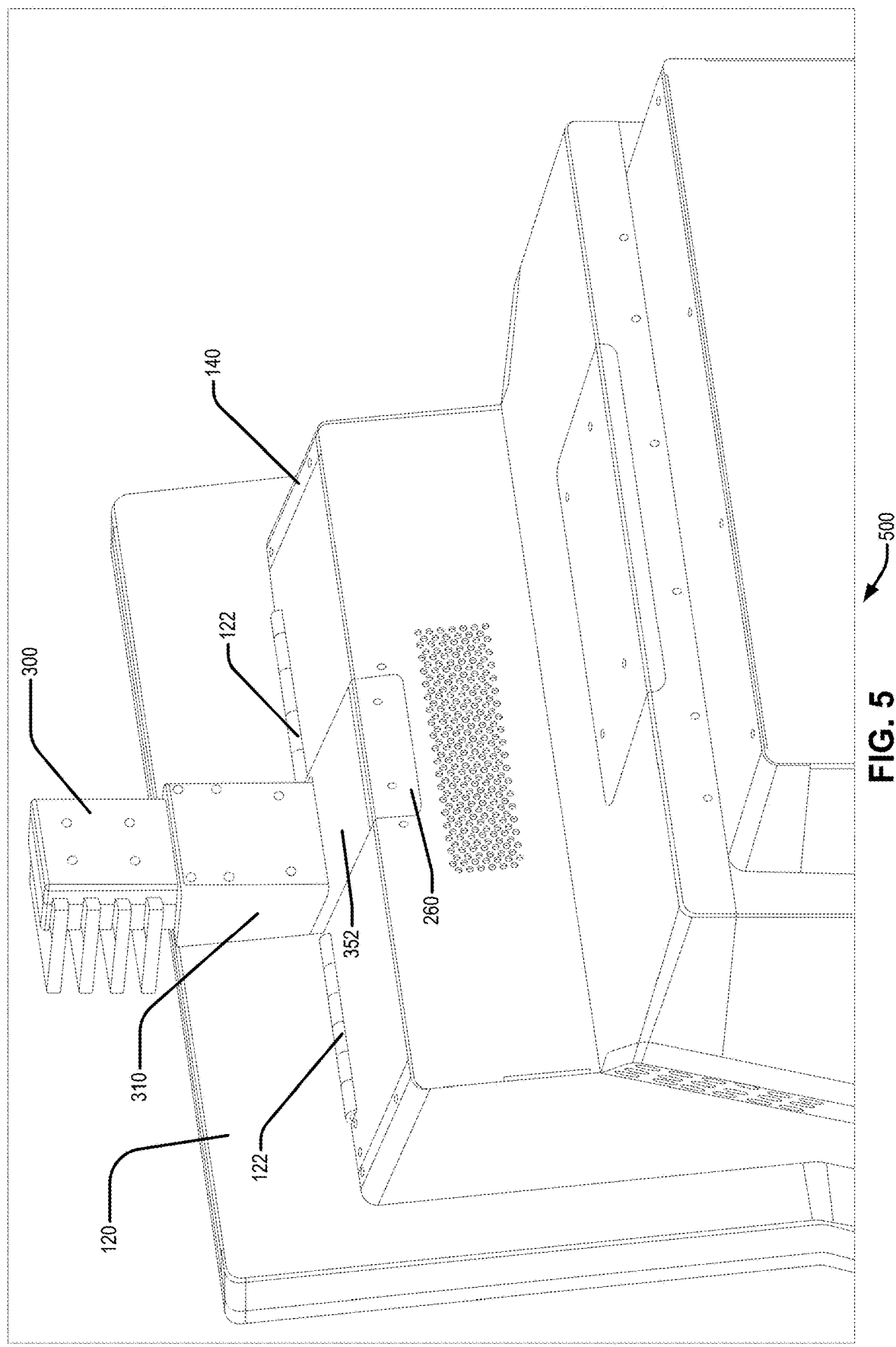
FIGS. 5-10 show a sequence of rear perspective views of a portion of an EGD cabinet, illustrating how the service light assembly 300 may be serviced and/or removed from the EGD from the front by accessing the interior of the EGD via the main door opening.

FIG. 5 shows a rear perspective view of a portion 500 of the EGD 100. In the specific example embodiment of FIG. 5, the main door assembly 120 is shown to be in its closed position. As illustrated in the example embodiment of FIG. 5, main door assembly 120 is implemented as a hinged main door assembly which opens upwards. The main door assembly 120 is movably or pivotably attached to the upper portion 140 of the EGD cabinet via hinges 122.

As illustrated in the example embodiment of FIG. 5, when main door assembly 120 is in its closed position, security plate 352 is caused to be positioned to fill an opening in the top portion of the gaming cabinet (e.g., opening 143, FIG. 6) to thereby block and/or prevent access to the interior of the EGD cabinet via that opening. Additionally, when main door assembly 120 is in its closed position, the service light assembly 300 is caused to be in a "substantially vertical" position. In at least one embodiment, the opening (e.g., 143, FIG. 6) is incorporated into the EGD cabinet design to facilitate the servicing, installation, and/or removal of the service light assembly 300.

Figure 6:
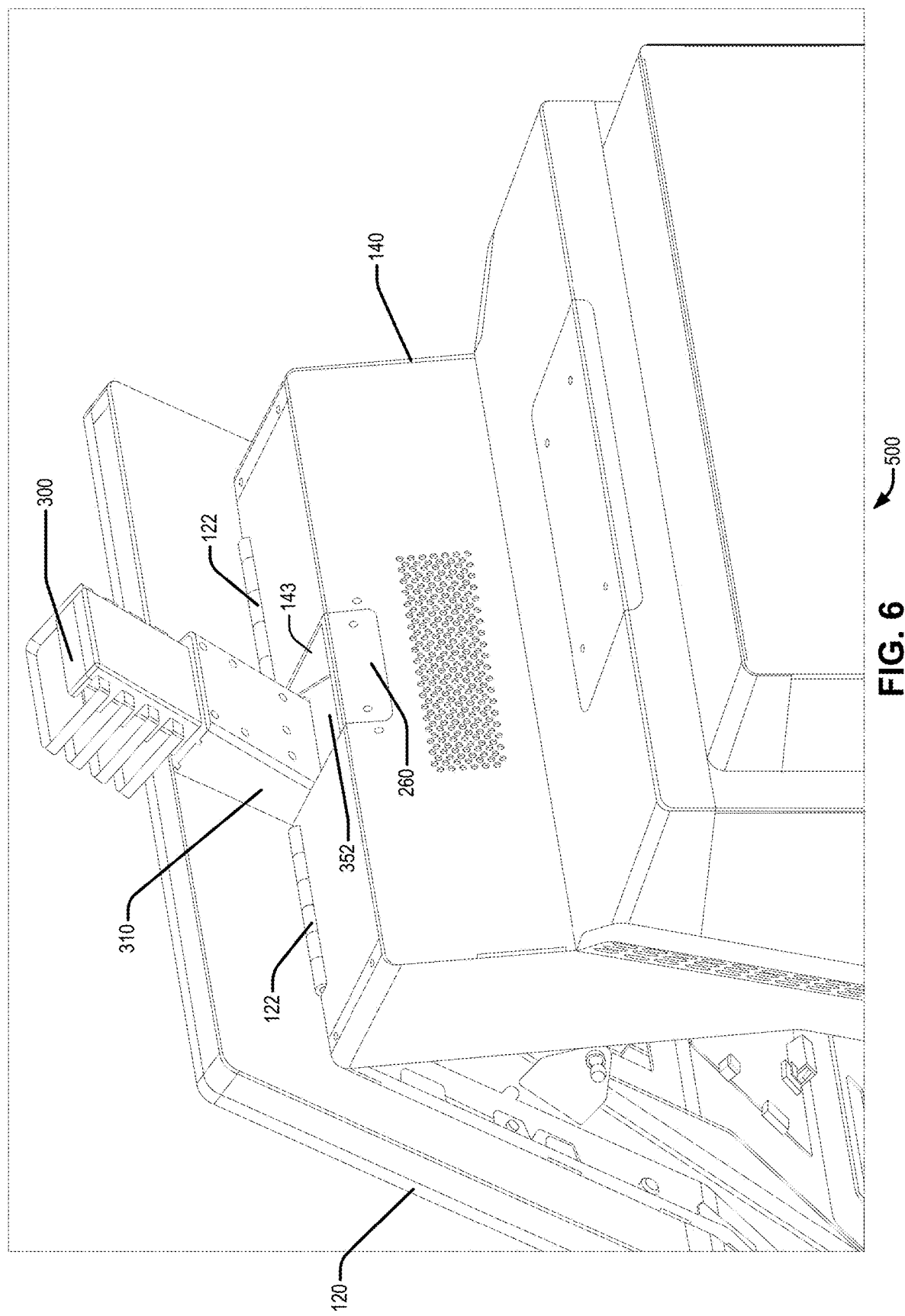

FIG. 6 illustrates a rear perspective view of portion 500 of the EGD in which the main door assembly 120 is shown to be in a partially open position. In the specific example embodiment of FIG. 6, main door assembly 120 is opened by moving the main door assembly upwards. The main door assembly 120 is movably or pivotably attached to the upper portion 140 of the EGD cabinet via hinges 122. Since the main door assembly is mounted to the EGD cabinet via hinges 122, the main door assembly swings upwards when it is opened. Additionally, as illustrated in the example embodiment of FIG. 6, as the lower portion of main door assembly 120 pivots upwards, the service light assembly (e.g., which is mounted to the main door assembly) pivots downwards, causing security plate 362 move into the interior of the EGD cabinet, and causing opening 143 to be exposed. In at least one embodiment, the opening 143 may be designed to receive the frame portion 310 of the service light assembly as the service light assembly 300 continues to pivot downwards.

Figure 7:
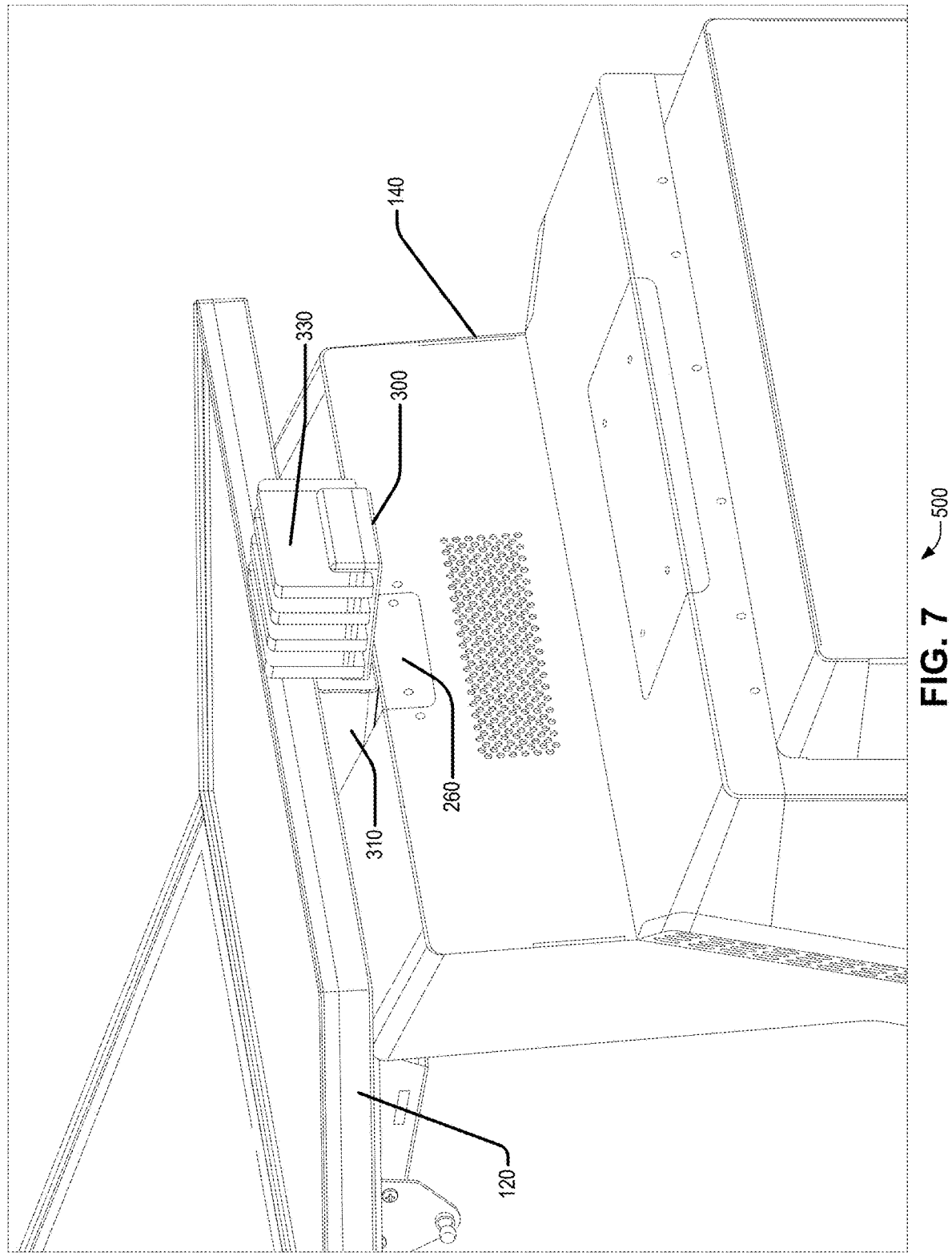

FIG. 7 illustrates a rear perspective view of portion 500 of the EGD in which the main door assembly 120 is shown to be in a fully open position. As illustrated in the example embodiment of FIG. 7, when the main door assembly 120 is in its fully open position, the service light assembly 300 is caused to be in a "substantially horizontal" position, with a first portion the service light assembly disposed at the interior of the EGD cabinet, a second portion of the service light assembly (including frame portion 310) extending through opening 143, and a third portion of the service light assembly (including candle assembly 330) disposed at the exterior of the EGD cabinet.

In at least one embodiment, in order to remove the service light assembly 300 from the EGD cabinet, the service light assembly needs to be detached from the main door assembly, and the back plate 260 need to be removed to expose opening 801.

For example, referring to FIG. 4, when the main door assembly 120 is in its fully open position, the service light assembly 300 may be detached or disconnected from the main door assembly 120 by accessing the interior of the cabinet, and manually removing screws 353 (e.g., FIG. 4) which are used to attach the service light assembly to the main door assembly. Additionally, any electrical connections to the service light assembly may be disconnected. Additionally, back plate 260 may be detached from the EGD cabinet by accessing the interior of the cabinet, and manually removing fasteners (e.g., nuts 262) which are used to attach the back plate 260 to the EGD cabinet.

Figure 8:
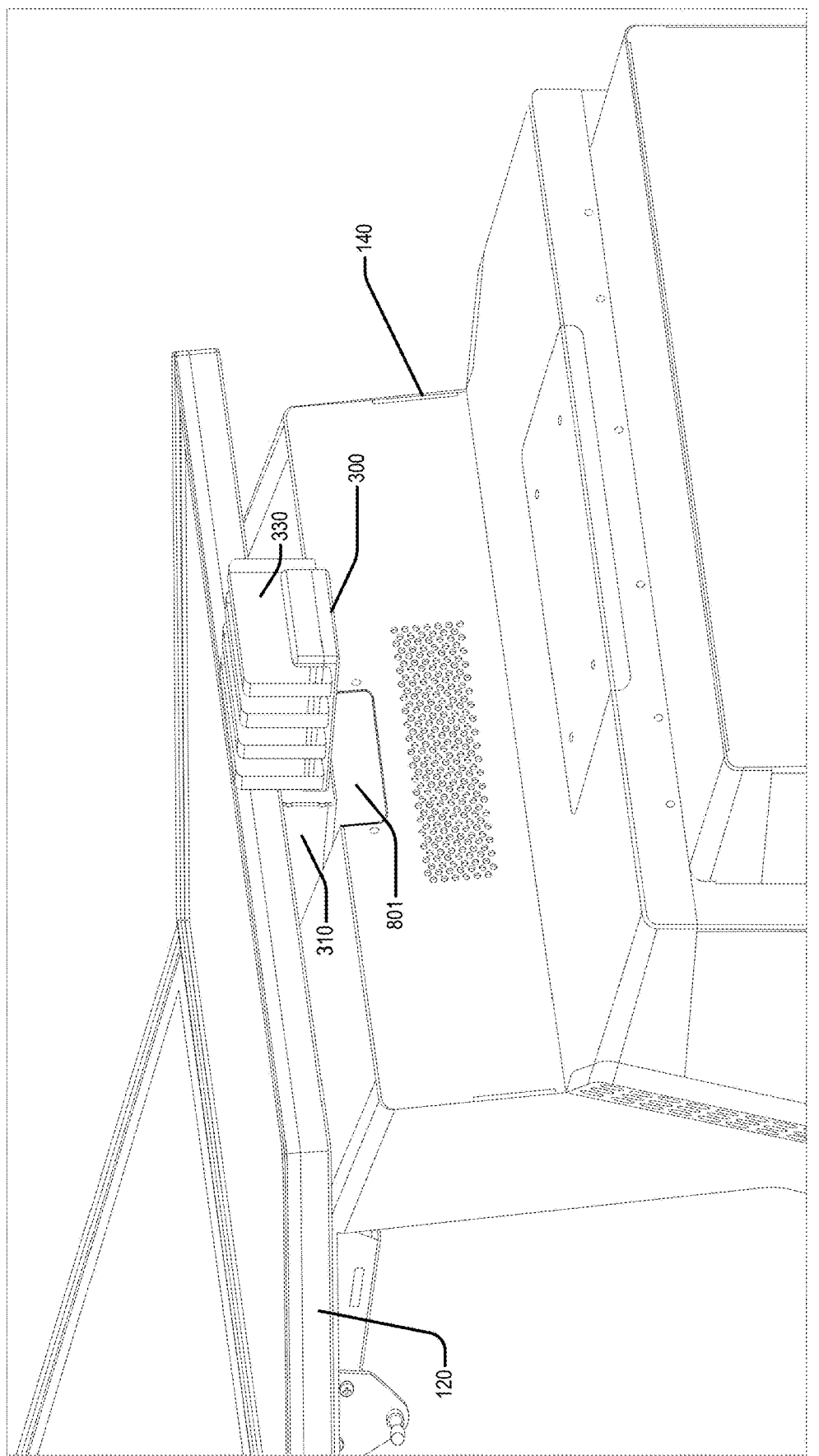
Figure 9:
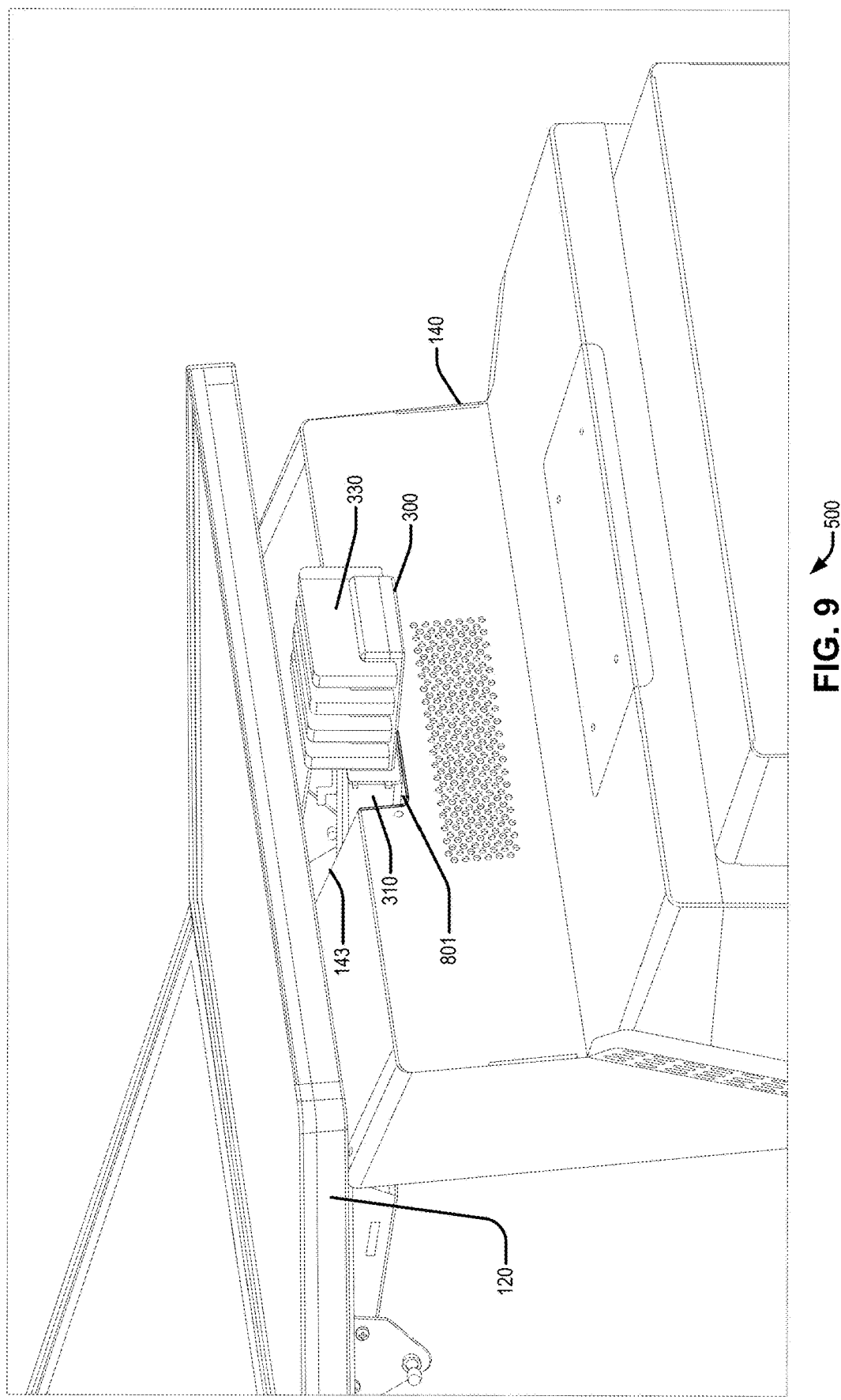

FIG. 8 shows a rear perspective view of portion 500 of the EGD is shown in which the main door assembly 120 is configured to be in its fully open position, and in which the back plate (e.g., 260, FIG. 7) has been removed to expose opening 801.

FIG. 9 illustrates a rear perspective view of portion 500 of the EGD after the service light assembly has been detached from the main door assembly, and the back plate 260 has been removed to expose opening 801. As illustrated in the example embodiment of FIG. 9, after the service light assembly has been detached from the main door assembly, and the back plate 260 has been removed to expose opening 801, the service light assembly 300 may be detached from the main door assembly 120 and moved downward into the opening 801. In at least one embodiment, the openings 143 and 801 are configured or designed to cooperate together to form a combined opening which is specifically configured or designed to enable the candle assembly portion 330 of the service light assembly to pass through the combined opening, as illustrated, for example, in FIG. 10.

Figure 10:
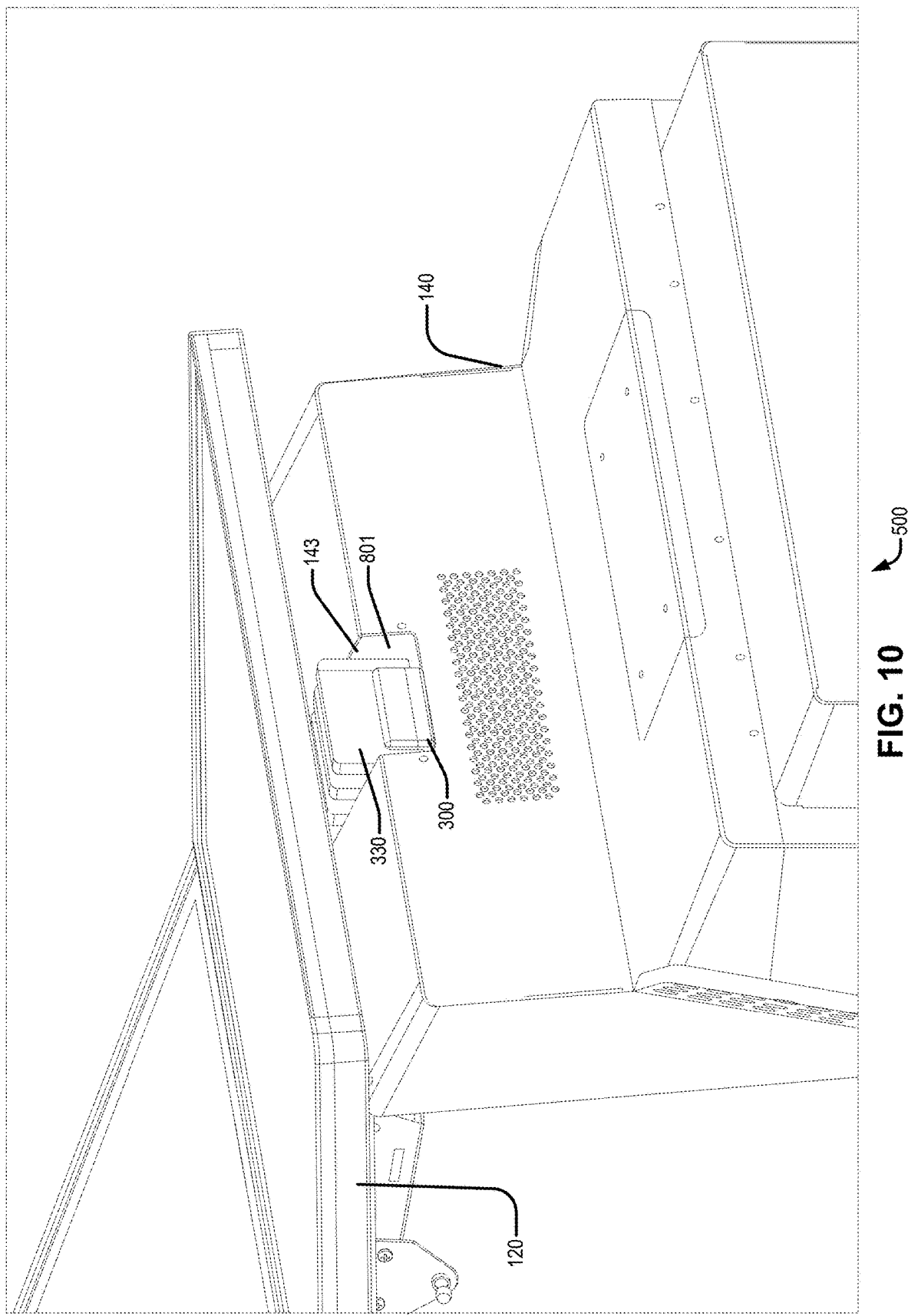

FIG. 10 illustrates a rear perspective view of portion 500 of the EGD after the service light assembly has been detached from the main door assembly, the back plate 260 has been removed to expose opening 801, and the service light assembly lowered into the opening 801 and then moved forward (e.g., towards front of cabinet) in a manner which allows the candle assembly portion 330 of the service light assembly to pass from the exterior of the gaming cabinet, through the combined opening (e.g., comprising back plate opening 801 and cabinet top opening 143) and into the interior of the EGD cabinet.

In this way, the improved design features of the EGD 100 (e.g., which includes a hinged main door assembly that opens upwards), provides the ability for the service light assembly to be assembled, disassembled, removed, installed and/or serviced via the interior of the EGD cabinet with the main door open and without requiring access to the sides, back or top of the cabinet. Additionally, the improved design features of the EGD 100, provides the ability for the service light assembly to be fully serviced from the interior of the EGD cabinet via the main door assembly.

Figure 11:
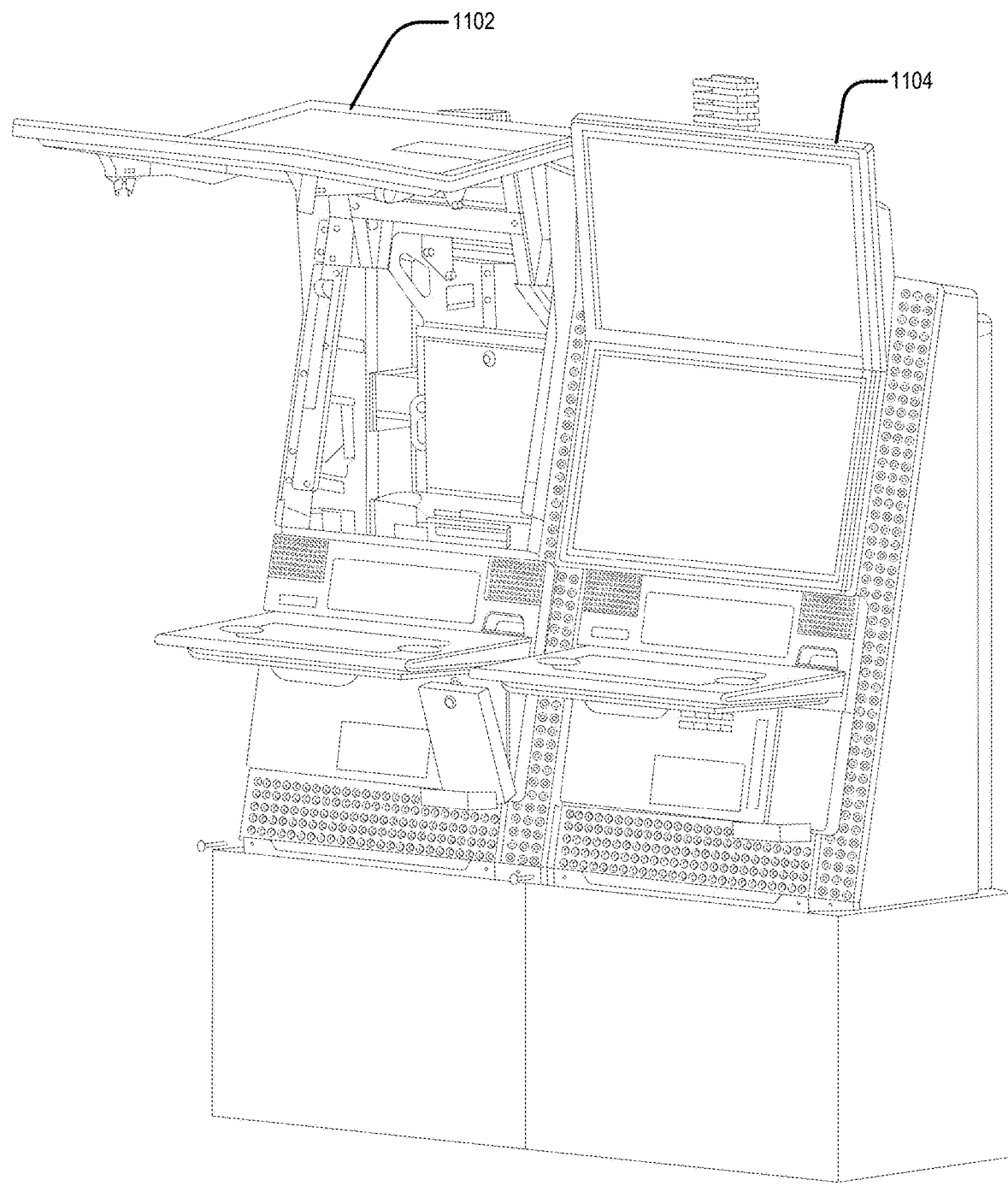
FIG. 11 shows an example front perspective view of 2 EGDs arranged in a banked configuration.

FIG. 11 shows an example front perspective view of two EGDs arranged in a banked configuration. As illustrated in the example embodiment of FIG. 11, one of the EGDs (1102) is shown with its main door assembly in the fully open position, while another EGD (1104) is shown with its main door assembly in the closed position.

Figure 12:
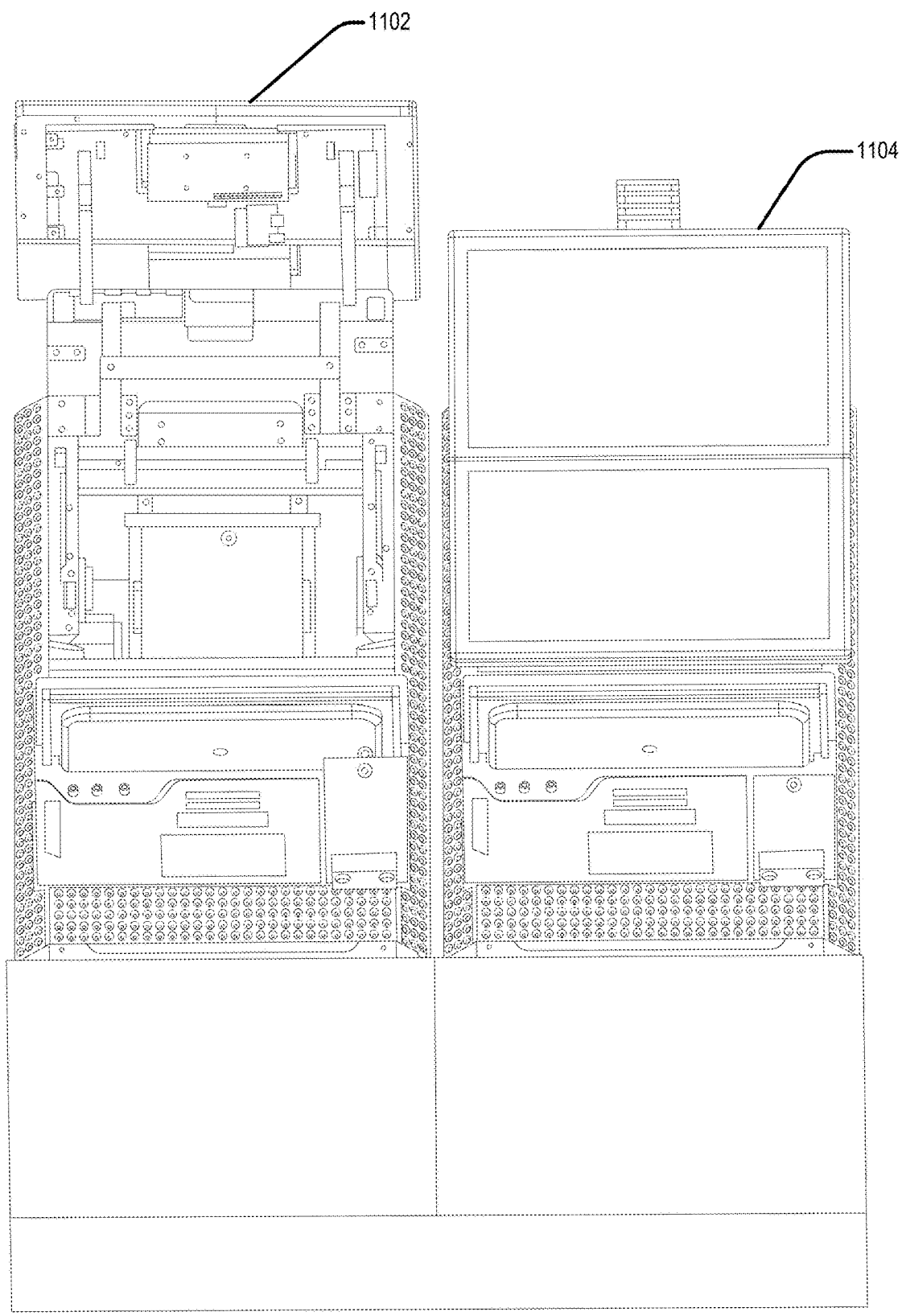
FIG. 12 shows an example front elevation view of two EGDs arranged in a banked configuration.

FIG. 12 shows an example front elevation view of the two banked EGDs of FIG. 11.

Figure 13:
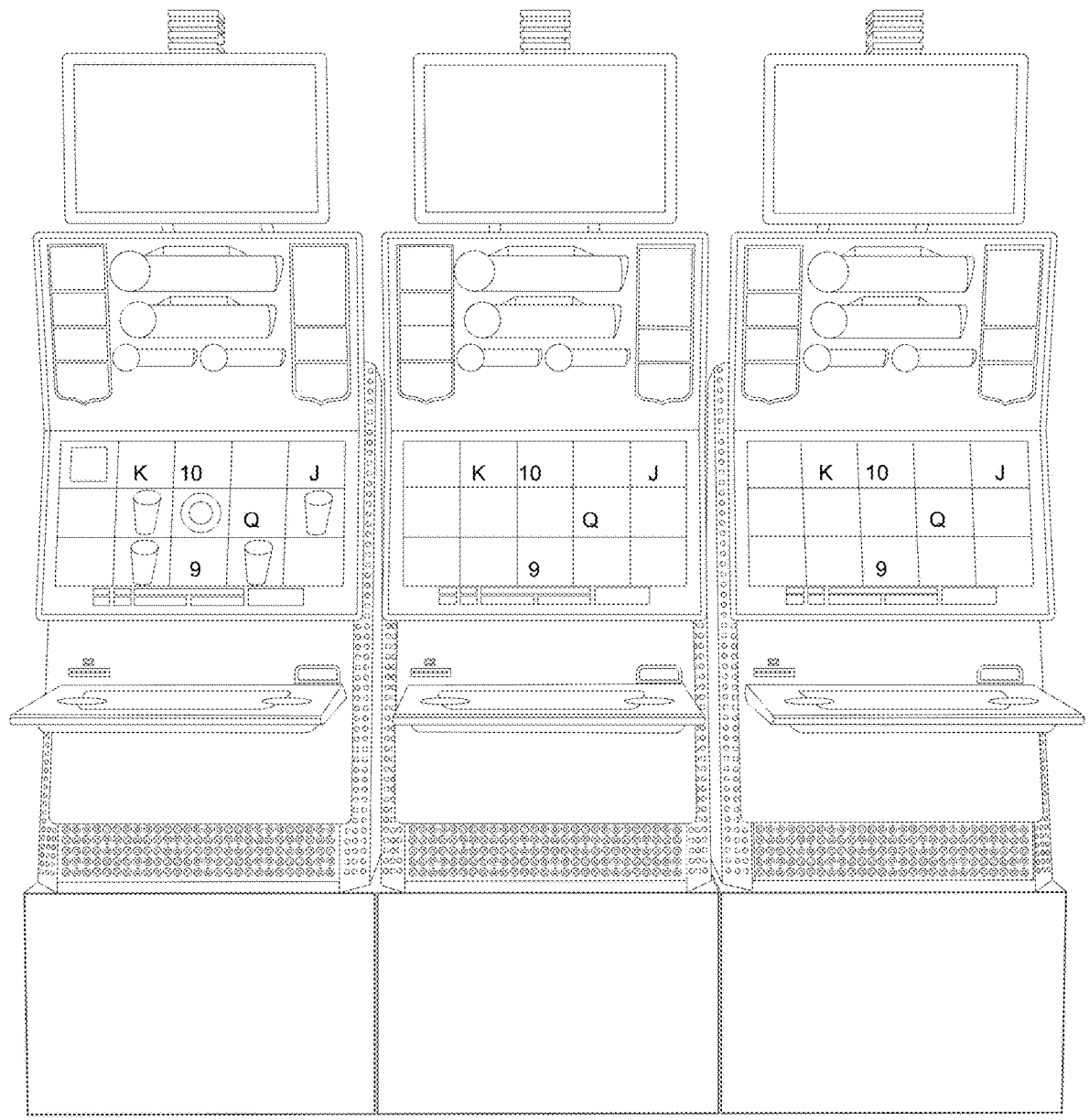
FIG. 13 shows an alternate example front elevation view of three EGDs arranged in a banked configuration.

FIG. 13 shows an example front elevation view of three EGDs 1300 arranged in a banked configuration.

As will readily be apparent from the example embodiments of FIGS. 11-13, the banked configuration of the EGDs restricts or prevents access to the sides of the various EGDs. Additionally, access to the rear of the banked EGDs is often restricted, prevented, or otherwise hampered by walls (e.g., where banked EGDs are positioned along a wall) and/or other EGD which are deployed adjacent to the banked EGDs (e.g., where two rows of banked EGDs are deployed back-to-back).

Figure 14:
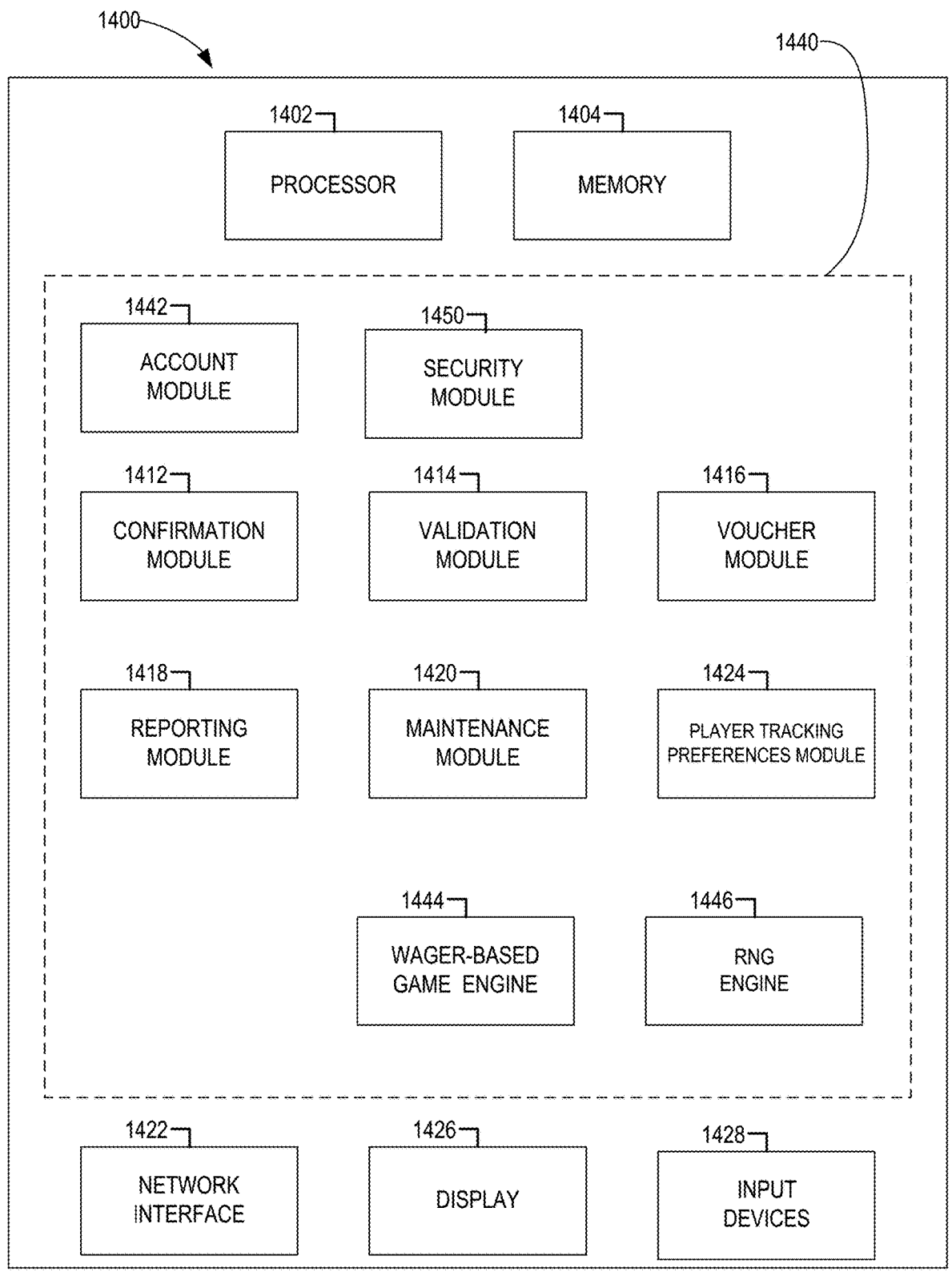
FIG. 14 shows a block diagram of electronic gaming device 1400, in accordance with a specific embodiment.

FIG. 14 shows a block diagram 1400 of electronic gaming device 1400, in accordance with a specific embodiment. Electronic gaming device 1400 may include a processor 1402, a memory 1404, a network interface 1422, input devices 1428, and a display 1426.

Processor 1402 may generate gaming options based on predetermined betting structures and/or outcome categories. Predetermined betting structures may utilize more than one outcome category to generate via processor 1402 gaming options. Predetermined betting structures may combine any outcome category with any other outcome category to gaming options.

Processor 1402 may offer a gaming option which is structured so that the gaming option relates to more than one EGD. Processor 1402 may generate contingent gaming options and/or predetermined gaming options. Contingent gaming options 1410 may include structures such that when a triggering event occurs over one or more than one gaming event, racing event, and/or sporting event, the wager is activated.

Network interface 1422 may include configured or designed to enable electronic gaming device 1400 to communicate with remote devices/systems such as, for example, video/multimedia server(s), accounting/transaction server(s), gaming server(s), authentication server(s), player tracking server(s), voucher server(s), etc.

Input devices 1428 may include mechanical buttons, electronic buttons, a touchscreen, a microphone, cameras, an optical scanner, or any combination thereof. Input devices 1428 may be utilized to make a wager, to make an offer to buy or sell a voucher, to determine a voucher's worth, to cash in a voucher, to modify (e.g., change sound level, configuration, font, language, etc.) electronic gaming device

1400, to select a movie or music, to select type of content to be displayed on main and/or auxiliary screen(s) of EGD, or any combination thereof.

Security Module 1450 may include security sensors, locks, interfaces, switches, etc. In at least one embodiment, may also be configured or designed to monitor and report conditions detected at each of the EGD's security sensors/switches.

Wager-Based Game Engine 1444 may be configured or designed to manage the wager-based game event portion(s) of the wager-based game.

Random Number Generator (RNG) Engine 1446 may include software and/or hardware algorithm and/or processes which are used to generate random outcomes, and may be used by the Wager-Based Game Engine to generate wager-based game event outcomes, at least a portion of which may correspond to predetermined wager-based game event outcomes (as described in greater detail below).

Display 1426 may show video streams from one or more gaming devices, gaming objects from one or more gaming devices, computer generated graphics, predetermined gaming options, and/or contingent gaming options.

Memory 1404 may include various memory modules 1440. Memory 1404 via various memory modules 1440 may include a confirmation module 1412, a validation module 1414, a voucher module 1416, a reporting module 1418, a maintenance module 1420, a player tracking preferences module 1424, and an account module 1432.

Confirmation module 1412 may utilize data received from a voucher, the transaction history of the voucher (e.g., the voucher changed hands in a secondary market), and/or the identity of the player to confirm the value of the voucher. In another example, confirmation module 1412 may utilize game event data, along with voucher data to confirm the value of the voucher.

Validation module 1414 may utilize data received from a voucher to confirm the validity of the voucher.

Voucher module 1416 may store data relating to generated vouchers, redeemed vouchers, bought vouchers, and/or sold vouchers.

Reporting module 1418 may generate reports related to a performance of electronic gaming device 1400, electronic gaming system(s), wager-based game(s), video streams, gaming objects, credit device(s), identification device(s), etc.

In one implementation, reporting module 1418 may reside on a central server and can aggregate and generate real time statistics on betting activities at one or more wager-based games at one or more participating casino's. The aggregate betting statistics may include trends (e.g., aggregate daily wager volume and wager amount by game types, by casinos, and the like), top games with the most payouts, top tables with the most payouts, top search structures used by players, most popular wager-based game(s) by wager volume, most searched for game, wager-based game(s) with least payouts, weekly trends, monthly trends, and other statistics related to game plays, wagers, people, location, and searches.

The information and statistics generated by the server-based reporting module 1418 can be displayed publicly or privately. For example, popular trending and statistical information on wager volume and wager amount for the top ten wager-based games can be publicly displayed in a casino display system so that players can study and decide what game to play, where, when, etc. Such a public display of general statistics can also be posted on the Internet, sent out as a text, an email, or multimedia message to the player's smart phones, tablets, desktop computer, etc. In another example, the trending and statistical information can also be distributed privately to privileged players such as casino club members.

Maintenance module 1420 may track any maintenance that is implemented on electronic gaming device 1400 and/or electronic gaming system 200. Maintenance module 1420 may schedule preventative maintenance and/or request a service call based on a device error.

Player tracking preferences module 1424 may compile and track data associated with a players preferences.

Account module 1432 may include data relating to an account balance, a wager limit, a number of wagers placed, credit limits, any other player information, and/or any other account information.

Data from account module 1432 may be utilized to determine whether a wager may be accepted. For example, when a search has determined a triggering event, the device and/or system may determine whether to allow this wager based on one or more of a wager amount, a number of wagers, a wager limit, an account balance, and/or any other criteria.

In at least one embodiment, at least a portion of the modules discussed in block diagram 1400 may reside locally in gaming terminal 1400. However, in at least some embodiments, the functions performed by these modules may be implemented in one or more remote servers. For instance, modules 1406-420 and 1424 may each be on a remote server, communicating with gaming terminal 1400 via a network interface such as Ethernet in a local or a wide area network topology. In some implementations, these servers may be physical servers in a data center. In some other implementations, these servers may be virtualized. In yet some other implementations, the functions performed by these modules may be implemented as web services. For example, the predetermined game options module 1408 may be implemented in software as a web service provider. Gaming terminal 1400 would make service requests over the web for the available predetermined wager options to be displayed. Regardless of how the modules and their respective functions are implemented, the interoperability with the gaming terminal 1400 is seamless.

In one implementation, reporting module 1418 may reside on a central server and can aggregate and generate real time statistics on betting activities at one or more wager-based games at one or more participating casino's. The aggregate betting statistics may include trends (e.g., aggregate daily wager volume and wager amount by game types, by casinos, and the like), top games with the most payouts, top EGDs with the most payouts, top search structures used by players, most popular wager-based game(s) by wager volume, most searched for game(s), EGDs with least payouts, weekly trends, monthly trends, and other statistics related to game plays, wagers, people, location, and searches.

The information and statistics generated by the server-based reporting module 1418 can be displayed publicly or privately. For example, popular trending and statistical information on wager volume and wager amount for the top ten wager-based games can be publicly displayed in a casino display system so that players can study and decide what game to play, where, when, etc. Such a public display of general statistics can also be posted on the Internet, sent out as a text, an email, or multimedia message to the player's smart phones, tablets, desktop computer, etc. In another example, the trending and statistical information can also be distributed privately to privileged players such as casino club members.

Figure 15:
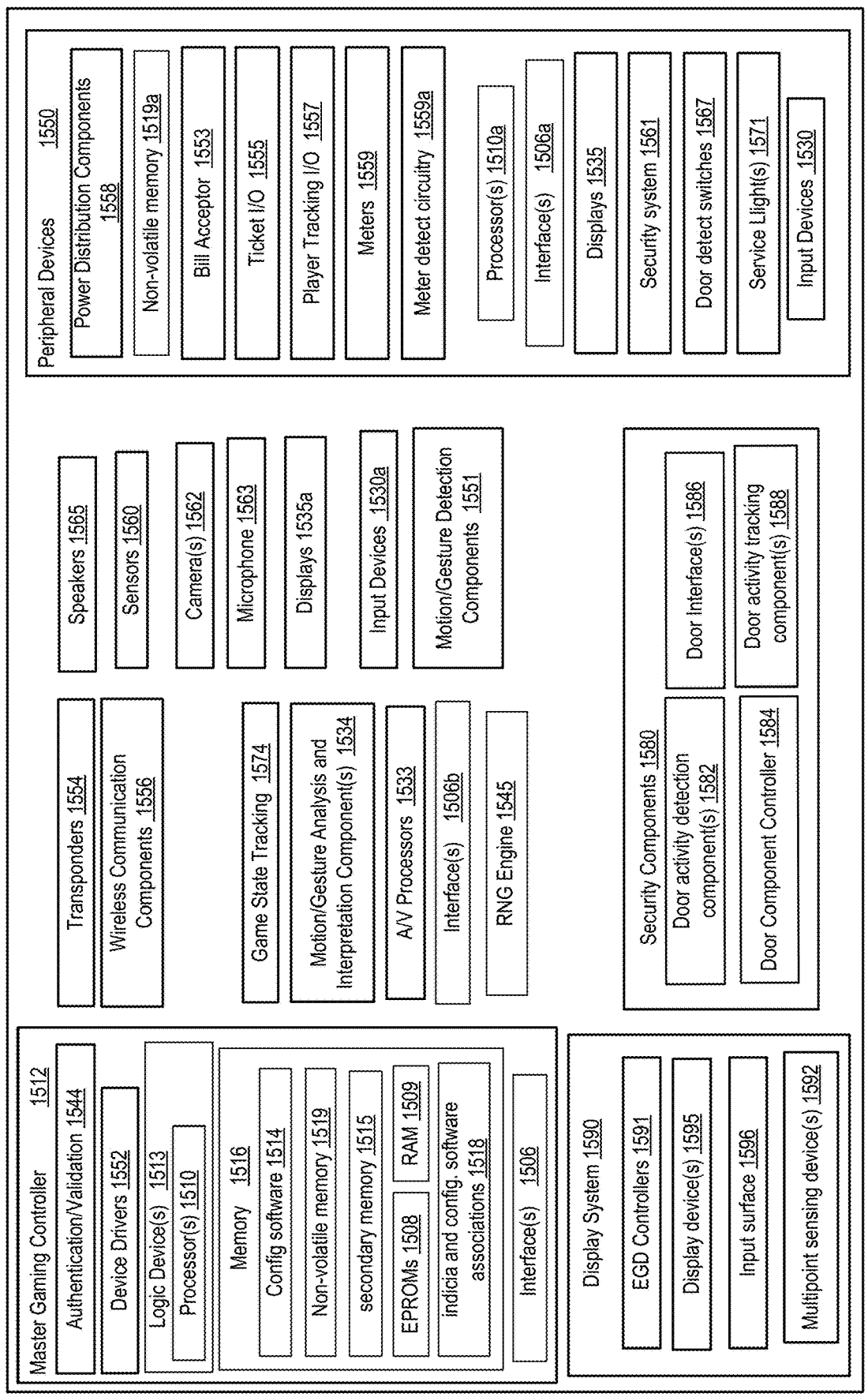
FIG. 15 provides a block diagram of an exemplary intelligent electronic gaming system 1500 according to one embodiment of the present disclosure.

FIG. 15 provides a block diagram of an exemplary intelligent electronic gaming system according to one embodiment of the present disclosure. In some embodiments, gaming system 1500 may be implemented as a gaming server. In other embodiments, gaming system 1500 may be implemented as an EGD or electronic gaming terminal ("EGT"). Gaming system 1500 can be implemented on a single EGD, such as those shown in the foregoing examples, or can be implemented across multiple EGDs, EGTs, and potentially other devices and system components, such as a system server, as will be readily appreciated.

Gaming system 1500 can include at least one processor 1510, at least one interface 1506, and memory 1516. Additionally, gaming system 1500 can include at least one master gaming controller 1512, a multi-touch sensor and display system 1590, a plurality of peripheral device components 1550, and various other components, devices, systems such as, for example, one or more of the following (or combinations thereof):

Transponders 1554;
Wireless communication components 1556;
Games state tracking components 1574;
Audio/video processors 1533 which, for example, may include functionality for detecting, analyzing and/or managing various types of audio and/or video information relating to various activities at the gaming system;
Various interfaces 1506b (e.g., for communicating with other devices, components, systems, etc.);
RNG Engine 1545;
Speakers 1565;
Sensors 1560;
One or more cameras 1562;
One or more microphones 1563;
Secondary display(s) 1535a;
Input devices 1530a;
Motion/gesture detection components 1551;
Motion/gesture analysis and interpretation components 1534; and
Accessibility components 1580, among other possible components.

In at least one embodiment, master gaming controller 1512 may include one or more of the following (or combinations thereof):

Authentication/validation components 1544;
Device drivers 1542;
Logic devices 1513, which may include one or more processors 1510;
Memory 1516, which may include one or more of the following (or combinations thereof): configuration software 1514, non-volatile memory 1519, secondary memory 1515, EPROMS 1508, RAM 1509, associations 1518 between indicia and configuration software; and
Interfaces 1506, among other possible components.

In at least one embodiment, display system 1590 may include one or more of the following (or combinations thereof):

Electronic Gaming Display ("EGD") controllers 1591;
Multipoint sensing device(s) (e.g., multi-touch surface sensors/components) 1592;
Display device(s) 1595; and
Input/touch surface 1596, among other possible components.

According to various embodiments, display device(s) 1595 may include one or more display screens utilizing various types of display technologies such as, for example, one or more of the following (or combinations thereof): LCDs (Liquid Crystal Display), Plasma, OLEDs (Organic Light Emitting Display), TOLED (Transparent Organic Light Emitting Display), Flexible (F)OLEDs, Active matrix (AM) OLED, Passive matrix (PM) OLED, Phosphorescent (PH) OLEDs, SEDs (surface-conduction electron-emitter display), EPD (ElectroPhoretic display), FEDs (Field Emission Displays) and/or other suitable display technology.

In at least one embodiment, Peripheral Devices 1550 may include one or more of the following (or combinations thereof):

Power distribution components 1558;
Non-volatile memory 1519a (and/or other types of memory);
Bill acceptor 1553;
Ticket I/O 1555;
Player tracking I/O 1557;
Meters 1559 (e.g., hard and/or soft meters);
Meter detect circuitry 1559a;
Processor(s) 1510a;
Interface(s) 1506a;
Display(s) 1535;
Independent security system 1561;
Door detect switches 1567;
Service Light component(s) 1571; and
Input devices 1530, among other possible components.

In one implementation, processor 1510 and master gaming controller 1512 can be included in a logic device 1513 enclosed in a logic device housing. The processor 1510 may include any conventional processor or logic device configured to execute software allowing various configuration and reconfiguration tasks such as, for example: a) communicating with a remote source via communication interface 1506, such as a server that stores authentication information or games; b) converting signals read by an interface to a format corresponding to that used by software or memory in the gaming system; c) accessing memory to configure or reconfigure game parameters in the memory according to indicia read from the device; d) communicating with interfaces, various peripheral devices and/or I/O devices; e) operating peripheral devices such as, for example, card readers, paper ticket readers, etc.; f) operating various I/O devices such as, for example, displays 1535, input devices 1530; etc. For instance, the processor 1510 may send messages including game play information to the displays 1535 to inform players of cards dealt, wagering information, and/or other desired information.

In at least one implementation, the gaming system may include card readers such as used with credit cards, or other identification code reading devices to allow or require player identification in connection with play of the card game and associated recording of game action. Such a player identification interface can be implemented in the form of a variety of magnetic card readers commercially available for reading a player-specific identification information. The player-specific information can be provided on specially constructed magnetic cards issued by a casino, or magnetically coded credit cards or debit cards frequently used with national credit organizations such as VISA, MASTERCARD, AMERICAN EXPRESS, or banks and other institutions.

The gaming system may include other types of participant identification mechanisms which may use a fingerprint image, eye blood vessel image reader, or other suitable biological information to confirm identity of the player. Still further it is possible to provide such participant identification information by having the dealer manually code in the information in response to the player indicating his or her code name or real name. Such additional identification could also be used to confirm credit use of a smart card, transponder, and/or player's personal player input device (UID).

The gaming system 1500 also includes memory 1516 which may include, for example, volatile memory (e.g., RAM 1509), non-volatile memory 1519 (e.g., disk memory, FLASH memory, EPROMs, etc.), unalterable memory (e.g., EPROMs 1508), etc. The memory may be configured or designed to store, for example: 1) configuration software 1514 such as all the parameters and settings for a game playable on the gaming system; 2) associations 1518 between configuration indicia read from a device with one or more parameters and settings; 3) communication protocols allowing the processor 1510 to communicate with peripheral devices and I/O devices 1550; 5) a secondary memory storage device 1515 such as a non-volatile memory device, configured to store gaming software related information (the gaming software related information and memory may be used to store various audio files and games not currently being used and invoked in a configuration or reconfiguration); 5) communication transport protocols (such as, for example, TCP/IP, USB, Firewire, IEEE1394, Bluetooth, IEEE 802.11x (IEEE 802.11 standards), hiperlan/2, HomeRF, etc.) for allowing the gaming system to communicate with local and non-local devices using such protocols; etc. In one implementation, the master gaming controller 1512 communicates using a serial communication protocol. A few examples of serial communication protocols that may be used to communicate with the master gaming controller include but are not limited to USB, RS-232 and Netplex (a proprietary protocol developed by IGT, Reno, Nev.).

A plurality of device drivers 1542 may be stored in memory 1516. Examples of different types of device drivers may include device drivers for gaming system components, device drivers for gaming system components, etc. Typically, the device drivers 1542 utilize a communication protocol of some type that enables communication with a particular physical device. The device driver abstracts the hardware implementation of a device. For example, a device drive may be written for each type of card reader that may be potentially connected to the gaming system. Examples of communication protocols used to implement the device drivers include Netplex, USB, Serial, Ethernet 575, Firewire, I/O debouncer, direct memory map, serial, PCI, parallel, RF, Bluetooth™, near-field communications (e.g., using near-field magnetics), 802.11 (WiFi), etc. Netplex is a proprietary IGT standard while the others are open standards. According to a specific embodiment, when one type of a particular device is exchanged for another type of the particular device, a new device driver may be loaded from the memory 1516 by the processor 1510 to allow communication with the device. For instance, one type of card reader in gaming system 1500 may be replaced with a second type of card reader where device drivers for both card readers are stored in the memory 1516.

In some embodiments, the software units stored in the memory 1516 may be upgraded as needed. For instance, when the memory 1516 is a hard drive, new games, game options, various new parameters, new settings for existing parameters, new settings for new parameters, device drivers, and new communication protocols may be uploaded to the memory from the master gaming controller 1512 or from some other external device. As another example, when the memory 1516 includes a CD/DVD drive including a CD/DVD designed or configured to store game options, parameters, and settings, the software stored in the memory may be upgraded by replacing a first CD/DVD with a second CD/DVD. In yet another example, when the memory 1516 uses one or more flash memory 1519 or EPROM 1508 units designed or configured to store games, game options, parameters, settings, the software stored in the flash and/or EPROM memory units may be upgraded by replacing one or more memory units with new memory units which include the upgraded software. In another embodiment, one or more of the memory devices, such as the hard-drive, may be employed in a game software download process from a remote software server.

In some embodiments, the gaming system 1500 may also include various authentication and/or validation components 1544 which may be used for authenticating/validating specified gaming system components such as, for example, hardware components, software components, firmware components, information stored in the gaming system memory 1516, and the like.

Sensors 1560 may include, for example, optical sensors, pressure sensors, RF sensors, Infrared sensors, motion sensors, audio sensors, image sensors, thermal sensors, biometric sensors, etc. As mentioned previously, such sensors may be used for a variety of functions such as, for example: detecting the presence and/or monetary amount of gaming chips which have been placed within a player's wagering zone; detecting (e.g., in real time) the presence and/or monetary amount of gaming chips which are within the player's personal space; and the like.

In one implementation, at least a portion of the sensors 1560 and/or input devices 1530 may be implemented in the form of touch keys selected from a wide variety of commercially available touch keys used to provide electrical control signals. Alternatively, some of the touch keys may be implemented in another form which are touch sensors such as those provided by a touchscreen display. For example, in at least one implementation, the gaming system player may include input functionality for enabling players to provide their game play decisions/instructions (and/or other input) to the dealer using the touch keys and/or other player control sensors/buttons. Additionally, such input functionality may also be used for allowing players to provide input to other devices in the casino gaming network (such as, for example, player tracking systems, side wagering systems, etc.).

Wireless communication components 1556 may include one or more communication interfaces having different architectures and utilizing a variety of protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetic communication protocols, etc. The communication links may transmit electrical, electromagnetic or optical signals which carry digital data streams or analog signals representing various types of information.

An example of a near-field communication protocol is the ECMA-340 "Near Field Communication-Interface and Protocol (NFCIP-1)", published by ECMA International (www.ecma-international.org), herein incorporated by reference in its entirety for all purposes. It will be appreciated that other types of Near Field Communication protocols may be used including, for example, near field magnetic communication protocols, near field RF communication protocols, and/or other wireless protocols which provide the ability to control with relative precision (e.g., on the order of centimeters, inches, feet, meters, etc.) the allowable radius of communication between at least 5 devices using such wireless communication protocols.

Power distribution components 1558 may include, for example, components or devices which are operable for providing wireless power to other devices. For example, in one implementation, the power distribution components 1558 may include a magnetic induction system which is adapted to provide wireless power to one or more portable UIDs at the gaming system. In one implementation, a UID docking region may include a power distribution component which is able to recharge a UID placed within the UID docking region without requiring metal-to-metal contact.

In at least one embodiment, motion/gesture detection component(s) 1551 may be configured or designed to detect player (e.g., player, dealer, and/or other persons) movements and/or gestures and/or other input data from the player. In some embodiments, each gaming system may have its own respective motion/gesture detection component(s). In other embodiments, motion/gesture detection component(s) 1551 may be implemented as a separate sub-system of the gaming system which is not associated with any one specific gaming system or device.

One or more cameras (e.g., 1562) may be used to monitor, stream and/or record image content and/or video content relating to persons or objects within each camera's view. For example, in at least one embodiment where the gaming system is implemented as an EGD or EGT, camera 1562 may be used to generate a live, real-time video feed of a player (or other person) who is currently interacting with the EGD or EGT. In some embodiments, camera 1562 may be used to verify a user's identity (e.g., by authenticating detected facial features), and/or may be used to monitor or track facial expressions and/or eye movements of a user who is interacting with the gaming system, such as to open an access door.

In various embodiments, the gaming system 1500 can also include various specialized access door activity components 1580. These can include one or more access door activity detection components 1582, an access door component controller 1584, one or more access door component interfaces 1586, and one or more access door activity tracking components 1588, among other possible components. These various access door activity components can interact with other components of gaming system 1500 as may be appropriate, such as by way of processors 1510, 1510*a*.

Access door component interfaces 1586 can include various components that casino personnel or another user can utilize to open or close an access door. This can include various manual inputs such as keyed locks or dedicated input panel buttons, as detailed above. Access door component interfaces 1586 can also include one or more motion sensors, RFID sensors, and/or other remotely operable buttons or inputs that may be used to facilitate door access from a remote location.

It should be understood that the devices, systems and methods described herein may be adapted and configured to function independently or may also interact with other systems or applications, such as for example, a casino management system or cash tracking system. As such, operator specific input/output door access data may be recorded and stored in connection with casino or resort management data, player information, or other data retrieved from a gaming machine, terminal or other pertinent location. It should also be readily apparent that additional computerized or manual systems may also be employed in accordance with the disclosure in order to achieve its full implementation as a system, apparatus or method.

The present application herein incorporates by reference, in its entirety and for all purposes, U.S. patent application Ser. No. 15/718,250, titled "MOUNTING CONFIGURATION AND METHOD FOR A TOPPER DISPLAY OF A GAMING MACHINE" by LEWIS et al., filed on 28 Sep. 2017.

The present application herein incorporates by reference, in its entirety and for all purposes, U.S. patent application Ser. No. 15/703,645, titled "GAMING MACHINE HAVING DOOR WITH EXTENDED OPENING AND CLOSING CONTROL" by HOHMAN et al., filed on 13 Sep. 2017.

The present application herein incorporates by reference, in its entirety and for all purposes, U.S. patent application Ser. No. 16/103,488, titled "GAMING MACHINE DISPLAY MOUNTING AND ALIGNMENT CONFIGURATION AND METHOD" by AMBRECHT et al., filed on 14 Aug. 2018.

The present application herein incorporates by reference, in its entirety and for all purposes, U.S. patent application Ser. No. 16/044,999, titled "COMPONENT MOUNTING CONFIGURATIONS FOR A GAMING MACHINE CABINET" by BRANDAU et al., filed on 25 Jul. 2018.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

It is claimed:

1. A gaming machine comprising:
    a cabinet including an entry that provides access to an interior of the cabinet, the cabinet further including external side portions, an external back portion, and an external top portion;
    a hinged main door assembly pivotably attached to the cabinet, the main door assembly being movable to a closed position which prevents access to the interior of the cabinet, the main door assembly being further movable to an open position which allows access to the interior of the cabinet;
    a first hinge connecting the main door assembly to the cabinet in a manner which enables the main door assembly to open upwards;
    a service light assembly having a candle assembly portion disposed at an exterior portion of the cabinet, the service light assembly being removably attachable to the main door assembly via a first set of fasteners;
    the cabinet including a first opening deployed at a rear portion of the cabinet, the first opening having a size and shape which enables the candle assembly portion to pass there through;
    a first plate removably attachable to the cabinet by a second set of fasteners, the first plate being attachable to the cabinet in a manner which covers or plugs the first opening; and
    wherein an entirety of the service light assembly is accessible and serviceable from the interior of the cabinet while the main door assembly is configured in the open position.

2. The gaming machine of claim 1 wherein an entirety of the service light assembly is accessible and serviceable from a front of the cabinet via the main door assembly and without requiring access to the external side portions, external back portion, and/or external top portion of the cabinet.

3. The gaming machine of claim 1 wherein an entirety of the service light assembly is configurable from a front of the cabinet via the main door assembly without requiring access to the external side portions, external back portion, and/or external top portion of the cabinet.

4. The gaming machine of claim 1 wherein the service light assembly is removably attachable to the cabinet via a front of the cabinet while the main door assembly is configured in the open position and without requiring access to the external side portions, external back portion, and/or external top portion of the cabinet.

5. The gaming machine of claim 1 wherein the service light assembly comprises a DIP switch which is accessible without removal of any fasteners.

6. A gaming machine comprising:
a cabinet including an entry that provides access to an interior of the cabinet, the cabinet further including external side portions, an external back portion, and an external top portion;
a main door assembly means pivotably attached to the cabinet, the main door assembly means being movable to a closed position which prevents access to the interior of the cabinet, the main door assembly means being further movable to an open position which allows access to the interior of the cabinet;
a first hinge connecting the main door assembly means to the cabinet in a manner which enables the main door assembly means to open upwards;
a service light assembly means having a candle assembly means portion disposed at an exterior portion of the cabinet, the service light assembly means being removably attachable to the main door assembly means via a first set of fasteners;
the cabinet including a first opening deployed at a rear portion of the cabinet, the first opening having a size and shape which enables the candle assembly means portion to pass therethrough;
a first plate removably attachable to the cabinet by a second set of fasteners, the first plate being attachable to the cabinet in a manner which covers or plugs the first opening; and
wherein an entirety of the service light assembly means is accessible and serviceable from the interior of the cabinet while the main door assembly means is in the open position.

7. The gaming machine of claim 6 wherein an entirety of the service light assembly means is accessible and serviceable from a front of the cabinet via the main door assembly means without requiring access to the external side portions, external back portion, and/or external top portion of the cabinet.

8. The gaming machine of claim 6 wherein an entirety of the service light assembly means is configurable from a front of the cabinet via the main door assembly means without requiring access to the external side portions, external back portion, and/or external top portion of the cabinet.

9. The gaming machine of claim 6 wherein the service light assembly means is removably attachable to the cabinet via a front of the cabinet while the main door assembly is configured in the open position and without requiring access to the external side portions, external back portion, and/or external top portion of the cabinet.

10. The gaming machine of claim 6 wherein the service light assembly means comprises a DIP switch which is accessible without removal of any fasteners.

\* \* \* \* \*